(12) United States Patent
Arakane et al.

(10) Patent No.: US 11,318,755 B2
(45) Date of Patent: May 3, 2022

(54) PRINTING APPARATUS

(71) Applicant: BROTHER KOGYO KABUSHIKI KAISHA, Nagoya (JP)

(72) Inventors: Satoru Arakane, Nagoya (JP); Tsuyoshi Ito, Nagoya (JP); Hirotoshi Maehira, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/159,229

(22) Filed: Jan. 27, 2021

(65) Prior Publication Data

US 2021/0229456 A1 Jul. 29, 2021

(30) Foreign Application Priority Data

Jan. 28, 2020 (JP) ............................. JP2020-012060

(51) Int. Cl.
*B41J 29/393* (2006.01)
*G06K 15/10* (2006.01)
*H04N 1/50* (2006.01)
*B41J 2/21* (2006.01)

(52) U.S. Cl.
CPC ........... *B41J 2/2132* (2013.01); *B41J 29/393* (2013.01); *G06K 15/102* (2013.01); *G06K 15/105* (2013.01); *H04N 1/506* (2013.01)

(58) Field of Classification Search
CPC ...... B41J 2/2132; G06K 15/105; H04N 1/506
See application file for complete search history.

(56) References Cited

U.S. PATENT DOCUMENTS

2017/0004390 A1 1/2017 Matsumura et al.
2019/0232679 A1* 8/2019 Arakane ................ B41J 2/2132
2019/0299594 A1 10/2019 Ito et al.

FOREIGN PATENT DOCUMENTS

EP 0730973 B2 * 11/2010 ........... G06K 15/105
JP 2017-013407 A 1/2017
JP 2019-177512 A 10/2019

* cited by examiner

*Primary Examiner* — Julian D Huffman
(74) *Attorney, Agent, or Firm* — Scully, Scott, Murphy & Presser, PC

(57) ABSTRACT

A printing apparatus includes a print execution section and a controller. The print execution section includes: a printing head having nozzles from which ink is discharged; a main-scan section configured to execute main-scan in which the printing head moves along a main-scan direction relative to a printing medium; and a sub-scan section configured to execute sub-scan in which the printing medium moves along a sub-scan direction relative to the printing head. The controller obtains object image data indicating an object image formed by pixels, generates pieces of partial printing data by processing the object image data in an order from a downstream side toward an upstream side in the sub-scan direction, and causes the print execution section to execute, a plurality of times, the sub-scan and partial printing in which ink is discharged from the printing head during the main-scan by use of the pieces of partial printing data.

21 Claims, 13 Drawing Sheets

PATTERN DATA

RECORDING RATIO

INCLUDING LETTERS ONLY

→ OVERLAP CANDIDATE AREA JAa IS NOT SET AS OVERLAP AREA THROUGH ESTIMATION

INCLUDING PHOTOGRAPH

→ OVERLAP CANDIDATE AREA JAb IS SET AS OVERLAP AREA SAb THROUGH ESTIMATION

Fig. 10A
CASE 1 INCLUDING ESTIMATION ERROR

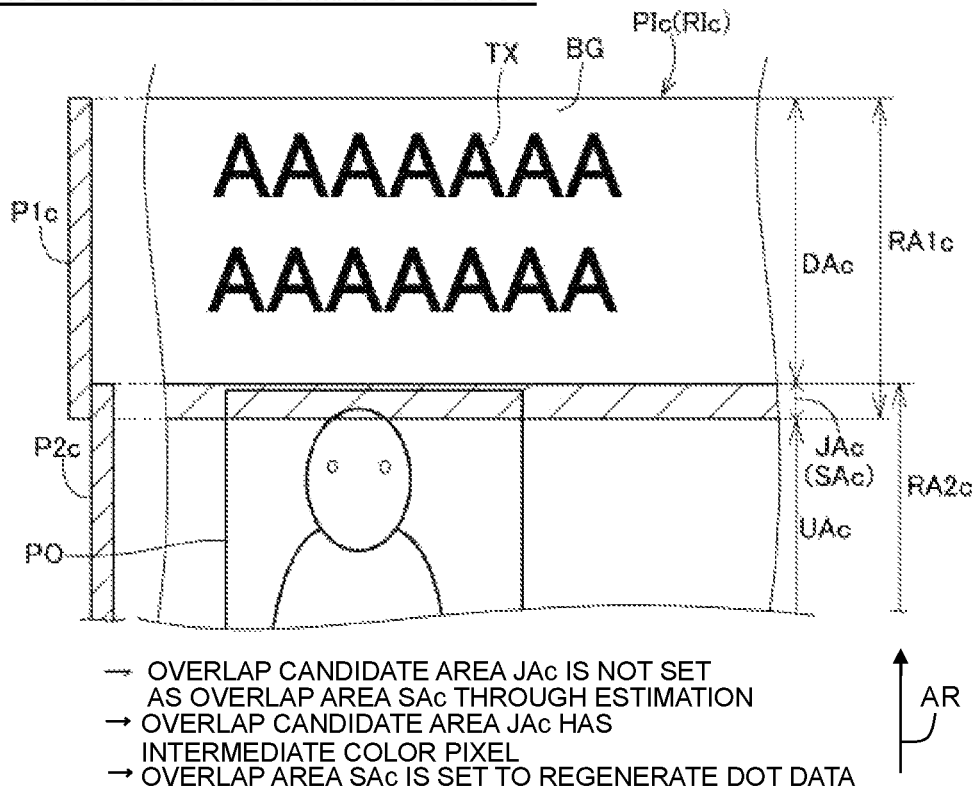

→ OVERLAP CANDIDATE AREA JAc IS NOT SET AS OVERLAP AREA SAc THROUGH ESTIMATION
→ OVERLAP CANDIDATE AREA JAc HAS INTERMEDIATE COLOR PIXEL
→ OVERLAP AREA SAc IS SET TO REGENERATE DOT DATA

Fig. 10B
CASE 2 INCLUDING ESTIMATION ERROR

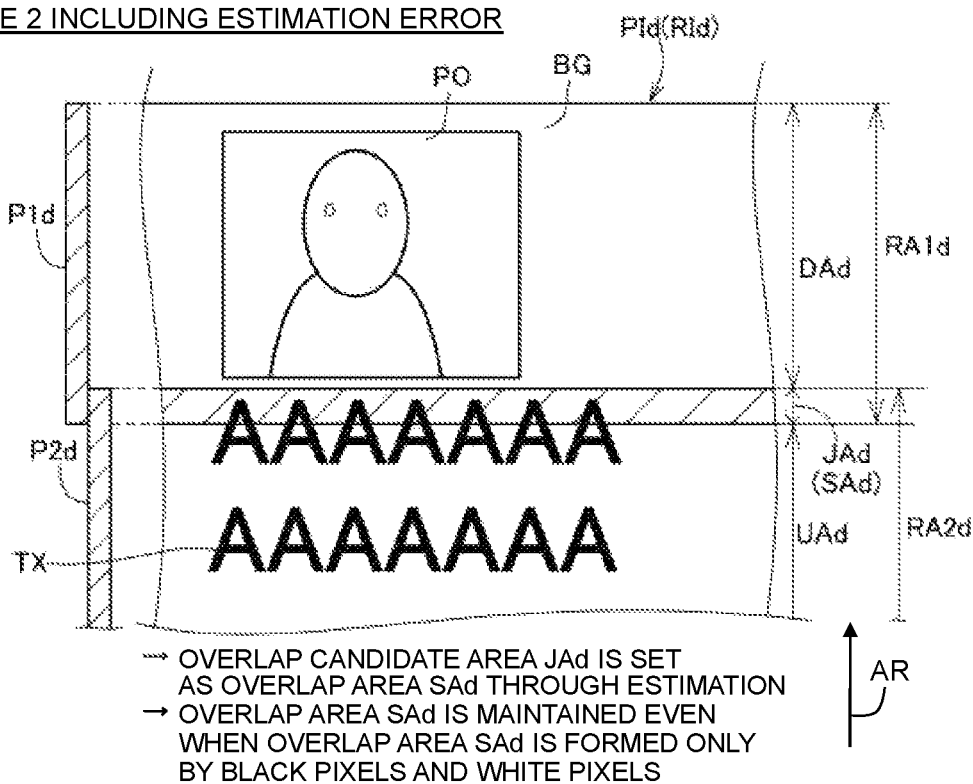

→ OVERLAP CANDIDATE AREA JAd IS SET AS OVERLAP AREA SAd THROUGH ESTIMATION
→ OVERLAP AREA SAd IS MAINTAINED EVEN WHEN OVERLAP AREA SAd IS FORMED ONLY BY BLACK PIXELS AND WHITE PIXELS

MODIFIED EXAMPLES
CASE IN WHICH OVERLAP AREA IS NOT SET

CASE IN WHICH OVERLAP AREA IS SET

MODIFIED EXAMPLES
INCLUDING LETTERS ONLY

→ OVERLAP CANDIDATE AREA JAg IS NOT SET AS OVERLAP AREA THROUGH ESTIMATION
→ ONLY FIXED OVERLAP AREA SAx IS SET AS OVERLAP AREA

INCLUDING PHOTOGRAPH

→ OVERLAP CANDIDATE AREA JAh IS SET AS OVERLAP AREA SAh THROUGH ESTIMATION
→ FIXED OVERLAP AREA SAx AND OVERLAP AREA SAh ARE SET

PRINTING APPARATUS

CROSS REFERENCE TO RELATED APPLICATION

The present application claims priority from Japanese Patent Application No. 2020-012060 filed on Jan. 28, 2020, the disclosure of which is incorporated herein by reference in its entirety.

BACKGROUND

Field of the Invention

The present specification relates to a print apparatus configured to cause a print execution section to execute, a plurality of times, sub-scan and partial printing in which ink is discharged from a printing head during main-scan.

Description of the Related Art

There is known a printer configured to form a printing image by executing main-scan and sub-scan. In the main-scan, ink is discharged during movement of a printing head in a main-scan direction. In the sub-scan, a printing medium is conveyed in a sub-scan direction intersecting with the main-scan direction. This printer can execute overlap printing in which an end of an area for which an image is formed by a previous main-scan overlaps with an end of an area for which an image is formed by a current main-scan. In the overlap area, an image is formed by the previous main-scan and the current main-scan. When a boundary between the two areas has a high density, the printer executes the overlap printing to inhibit banding. When the boundary has a low density, the printer does not execute the overlap printing to improve printing speed.

SUMMARY

In the above technique, however, whether or not the overlap printing is executed depends on the image at the boundary between the two areas, that is, the image in the area overlapped when the overlap printing is executed. Thus, for example, determination whether the overlap printing is executed is late and printing data may be required to be regenerated. Further, speed of generating the printing data and printing speed may be reduced.

The present specification disclosures a technique capable of inhibiting a decrease in printing speed.

According to an aspect of the present disclosure, there is provided a printing apparatus including: a print execution section and a controller, wherein the print execution section includes:
a printing head having a plurality of nozzles from which ink is discharged, the nozzles having different positions in a sub-scan direction;
a main-scan section configured to execute main-scan to move the printing head along a main-scan direction, which intersects with the sub-scan direction, relative to a printing medium; and
a sub-scan section configured to execute sub-scan to move the printing medium moves along the sub-scan direction relative to the printing head, wherein the controller is configured to:
obtain object image data indicating an object image formed by a plurality of pixels,
generate a plurality of pieces of partial printing data by processing the object image data in an order from a downstream side toward an upstream side in the sub-scan direction, and
cause the print execution section to execute, a plurality of times, the sub-scan and partial printing in which the ink is discharged from the printing head during the main-scan by use of the pieces of partial printing data, the object image includes a specified portion, a downstream portion positioned downstream of the specified portion in the sub-scan direction, and an upstream portion positioned upstream of the specified portion in the sub-scan direction, the partial printing executed the plurality of times includes first partial printing and second partial printing, the first partial printing being executed by use of first partial printing data from among the pieces of partial printing data, the second partial printing being executed after the first partial printing by use of second partial printing data from among the pieces of partial printing data, the controller is configured to determine whether the specified portion satisfies a specifying condition, not using data included in the object image data and corresponding to the specified portion but using data included in the object image data and corresponding to the downstream portion, in a case that the controller has determined that the specified portion does not satisfy the specifying condition, the controller is configured to:
generate the first partial printing data and the second partial printing data such that at least a part of the downstream portion is printed by the first partial printing, at least a part of the upstream portion is printed by the second partial printing, and the specified portion is printed by the first partial printing and the second partial printing, and
set a conveyance amount of the sub-scan between the first partial printing and the second partial printing to a first amount, in a case that the controller has determined that the specified portion satisfies the specifying condition, the controller is configured to:
generate the first partial printing data and the second partial printing data such that at least a part of the downstream portion is printed by the first partial printing, at least a part of the upstream portion is printed by the second partial printing, and the specified portion is printed by the first partial printing and is not printed by the second partial printing, and
set the conveyance amount of the sub-scan between the first partial printing and the second partial printing to a second amount that is larger than the first amount.

In the above configuration, in the case that the specifying condition is not satisfied, the specified portion is printed by the first partial printing and the second partial printing. This inhibits banding in the specified portion. In the case that the specifying condition is satisfied, the specified portion is printed only by the first partial printing. This makes the conveyance amount of the sub-scan larger than the case in which the specifying condition is not satisfied, thus inhibiting the decrease in printing speed. As a result, it is possible to inhibit both the decrease in printing speed and the decrease in image quality. Further, the controller determines whether the specified portion satisfies the specifying condition not using the data corresponding to the specified portion but using the data corresponding to the downstream portion. The controller can thus determine whether the specified portion is printed by the first partial printing and the second partial printing or whether the specified portion is printed only by the first partial printing, before the data corresponding to the specified portion is processed. This may eliminate re-execution of the process of generating the pieces of partial printing data (e.g., part of the first partial printing data) required for printing the specified portion, thus making it possible to inhibit both the decrease in speed of generating the partial printing data and the decrease in printing speed.

The technique disclosed in the present specification can be achieved in a variety of embodiments. For example, the technique disclosed in the present specification can be achieved in a printing apparatus, a method of controlling a printing apparatus, an image processing method, a computer program for achieving the methods or functions of the apparatus, a recording medium recording the computer program, and the like.

BRIEF DESCRIPTION OF THE DRAWINGS

FIGS. 10A and 10B are a second diagram each indicating an exemplary object image and an exemplary printing image.

DESCRIPTION OF THE EMBODIMENTS

Figure 1:
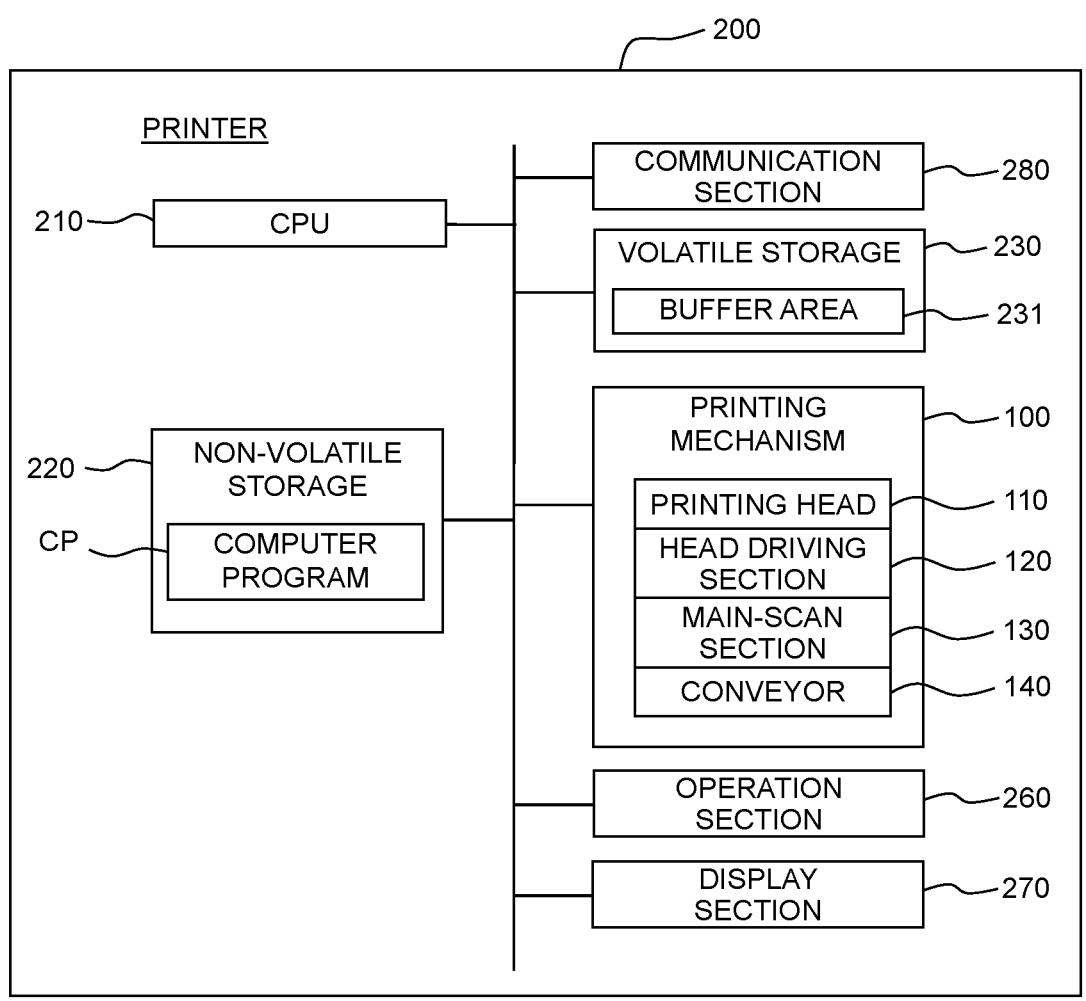
FIG. 1 is a block diagram of a configuration of a printer.

Referring to the drawings, an embodiment of the present disclosure is explained below.
<Configuration of Printer 200>
As depicted in FIG. 1, a printer 200 includes, for example, a printing mechanism 100 as a print execution section, a CPU 210 as a controller for the printing mechanism 100, a non-volatile storage 220 such as a hard disk drive, a volatile storage 230 such as a hard disk and flash memory, an operation section 260 for obtaining an operation instruction from a user such as buttons and a touch panel, a display section 270 such as a liquid crystal display, and a communication section 280. The printer 200 is connected to an external apparatus, such as a terminal apparatus (not depicted) of a user, via the communication section 280 so that the printer 200 can communicate with the external apparatus.

The volatile storage 230 provides a buffer area 231 that temporarily stores various intermediate data, which is generated when the CPU 210 executes a process. A computer program CP is stored in the non-volatile storage 220. In this embodiment, the computer program CP is a control program for controlling the printer 200. The computer program CP may be provided by being stored in the non-volatile storage 220 before shipment. The computer program CP may be provided by being downloaded from a server. Alternatively, the computer program CP may be provided by being stored in a DVD-ROM or the like. The CPU 210 executes a printing process described below by controlling, for example, the printing mechanism 100 through execution of the computer program CP.

The printing mechanism 100 executes printing by discharging respective inks (liquid droplets) of cyan (C), magenta (M), yellow (Y), and black (K). The printing mechanism 100 includes a printing head 110, a head driving section 120, a main-scan section 130, and a conveyor 140.

Figure 2:
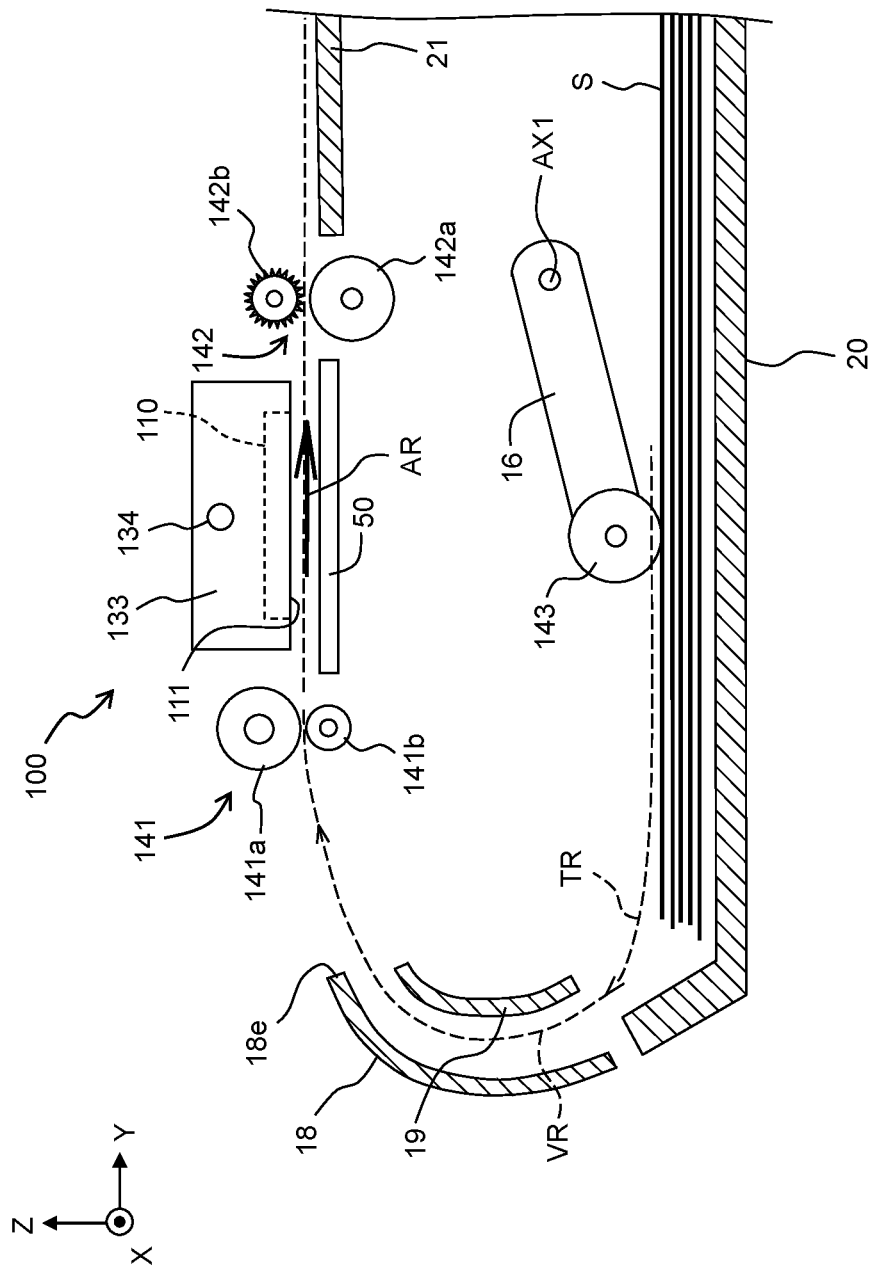
FIG. 2 depicts a schematic configuration of a printing mechanism.

As depicted in FIG. 2, the printing mechanism 100 further includes a feed tray 20 in which sheets S before printing are accommodated in a state of being stacked on top of each other, a discharge tray 21 on which the sheet(s) for which printing has been executed is/are discharged, and a platen 50 disposed to face a nozzle formation surface 111 of the printing head 110.

The conveyor 140 conveys the sheet S such that the sheet S fed from the feed tray 20 passes through a space between the printing head 110 and the platen 50 along a conveyance route TR connected to the discharge tray 21. In other words, the conveyor 140 executes sub-scan to move the sheet S in a conveyance direction AR described below relative to the printing head 110. The conveyance route TR includes a curved route VR that is a curved portion when seen in an X direction of FIG. 2. The curved route VR is positioned between a pick-up roller 143 described below on the conveyance route TR and an upstream-side roller pair 141. The X direction is a direction orthogonal to the conveyance direction AR and parallel to a printing surface of the sheet S conveyed. An upstream side in the conveyance route TR is simply referred to as an upstream side and a downstream side in the conveyance route TR is simply referred to as a downstream side.

The conveyor 140 includes an outside guide member 18 and an inside guide member 19 that guide the sheet S along the conveyance route TR, the pick-up roller 143 provided on the conveyance route TR, the upstream-side roller pair 141, and a downstream-side roller pair 142.

The outside guide member 18 and the inside guide member 19 are disposed in the curved route VR. The outside guide member 18 supports the curved sheet S in the curved route VR from a side of an outside surface (printing surface) of the sheet S. The inside guide member 19 supports the curved sheet S in the curved route VR from a side of an inside surface (a surface opposite to the printing surface) of the sheet S.

The pick-up roller 143 is attached to a front end of an arm 16 that is pivotable around an axis AX1. The pick-up roller 143 holds the sheet S by nipping the sheet S between itself and the feed tray 20. In other words, the pick-up roller 143 is disposed upstream of the upstream-side roller pair 141 in the conveyance route TR to hold the sheet S. The pick-up roller 143 picks up the uppermost sheet S from among the sheets S accommodated in the feed tray 20 and sends or feeds it to the conveyance route TR.

The upstream-side roller pair 141 includes a driving roller 141a driven by a motor (not depicted) and a driven roller 142b that rotates along with the rotation of the driving roller 141a. Similarly, the downstream-side roller pair 142 includes a driving roller 142a and a driven roller 142b. The driven roller 142b of the downstream-side roller pair 142 includes spurs having a thin-plate shape, and the spurs are arranged on the same axis. This inhibits a printing image printed on the sheet S from being damaged. Each of the driving roller 141a, the driven roller 141b, and the driving roller 142a is, for example, a cylindrical roller. The driving rollers 141a and 142a may be driven rollers, and the driven rollers 141b and 142b may be driving rollers.

The upstream-side roller pair 141 holds the sheet S at the upstream side of the printing head 110. The downstream-side roller pair 142 holds the sheet S at the downstream side of the printing head 110. The conveyance direction AR of FIG. 2 is a conveyance direction (+Y direction) of the sheet S between the printing head 110 and the platen 50.

The main-scan section 130 includes a carriage 133 that carries the printing head 110 and a sliding shaft 134 that holds the carriage 133 so that the carriage 133 can reciprocate in a main-scan direction (X axis direction). The main-scan section 130 uses power of a main-scan motor (not depicted) to cause the carriage 133 to reciprocate along the sliding shaft 134. This results in main-scan in which the printing head 110 reciprocates in the main-scan direction. That is, the carriage 133 executes, in accordance with an instruction of the CPU 210, the main-scan to move the printing head 110 in the main-scan direction relative to the sheet S.

Figure 3:
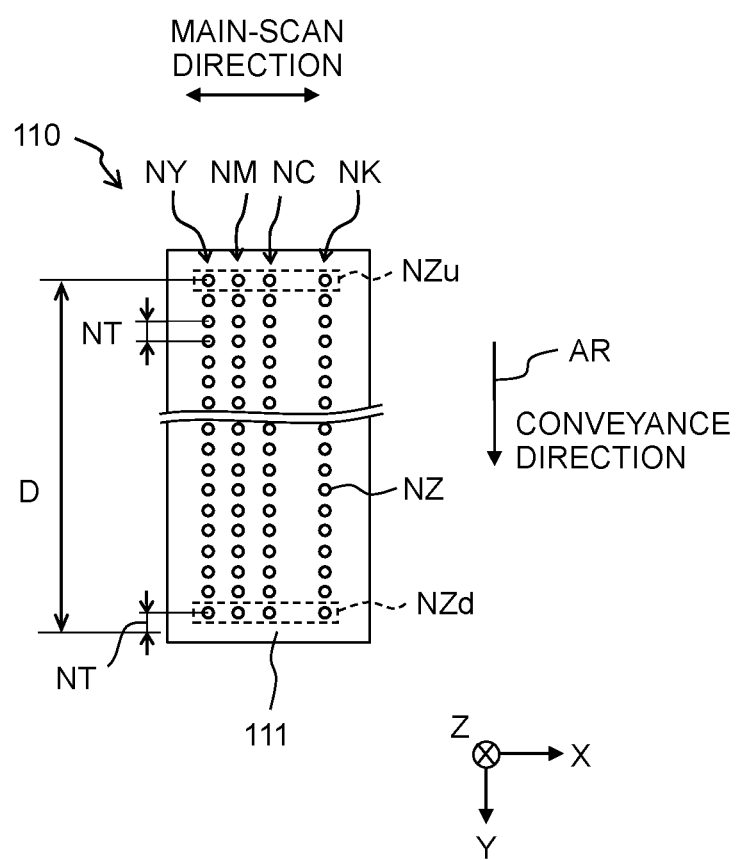
FIG. 3 depicts a configuration of a printing head.

As depicted in FIG. 3, nozzle rows formed by nozzles, that is, nozzle rows NC, NM, NY, and NK from which respective inks of C, M, Y, and K are discharged are formed in the nozzle formation surface 111 facing the platen 50 of the printing head 110. Each nozzle row includes nozzles NZ. The nozzles NZ have different positions in the conveyance orientation AR. The nozzles NZ are arranged in the conveyance direction AR at a predefined nozzle interval NT. That is, the printing head 110 includes the nozzles NZ having different positions in the conveyance direction AR and from which the inks are discharged. The nozzle interval NT is a length in the conveyance direction AR between two nozzles NZ included in the nozzles NZ and adjacent to each other in the conveyance direction AR. The nozzles NZ included in the nozzles forming the nozzle rows and positioned at the most upstream side (−Y side) are also referred to as most upstream nozzles NZu. The nozzles NZ included in the nozzles forming the nozzle rows and positioned at the most downstream side (+Y side) are also referred to as most downstream nozzles NZd. A length obtained by adding the nozzle interval NT to a length in the conveyance direction AR from the most upstream nozzles NZu to the most downstream nozzles NZd is also referred to as a nozzle length D.

The head driving section 120 drives the printing head 110 that is reciprocated by the main-scan section 130 on the sheet S conveyed by the conveyor 140. That is, the printing head 110 forms dots on the sheet S by discharging ink(s) from the nozzles NZ of the printing head 110. An image is thus printed on the sheet S.

<Outline of Printing>

The CPU 210 (FIG. 1) of the printer 200 executes the printing process (details described below) based on a printing instruction from a user. In the printing process, pieces of partial printing data are generated by using RGB image data (object image data) and the pieces of partial printing data are output to the printing mechanism 100. In other words, the CPU 210 processes the RGB image data in an order from the downstream side toward the upstream side in the conveyance direction AR in an RGB image to be printed on the sheet S, thus generating the pieces of partial printing data. A piece of partial printing data is printing data for executing partial printing SP once. The partial printing SP is described below.

The printing mechanism 100 executes printing in accordance with the pieces of partial printing data corresponding to the partial printing SP executed a plurality of times. That is, the partial printing executed the plurality of times includes first partial printing (a first partial printing process) executed using first partial printing data from among the pieces of partial printing data and second partial printing (a second partial printing process) executed after the first partial printing by using second partial printing data from among the pieces of partial printing data. Specifically, the CPU 210 outputs the pieces of partial printing data to the printing mechanism 100 to control the head driving section 120, the main-scan section 130, and the conveyor 140, and alternately repeats the partial printing SP and sheet conveyance T. In the partial printing SP executed once, ink(s) is/are discharged from the nozzles NZ of the printing head 100 to the sheet S while the main-scan is executed once in a state where the sheet S is stopped on the platen 50. Accordingly, dots forming a part of a printing image PI are formed on the sheet S. In the sheet conveyance T executed once, the sheet S is moved or conveyed in the conveyance direction AR by a predefined conveyance amount. In this embodiment, the CPU 210 causes the printing mechanism 100 to execute m times of (m is an integer equal to or more than two) partial printing SPm.

Figure 4:
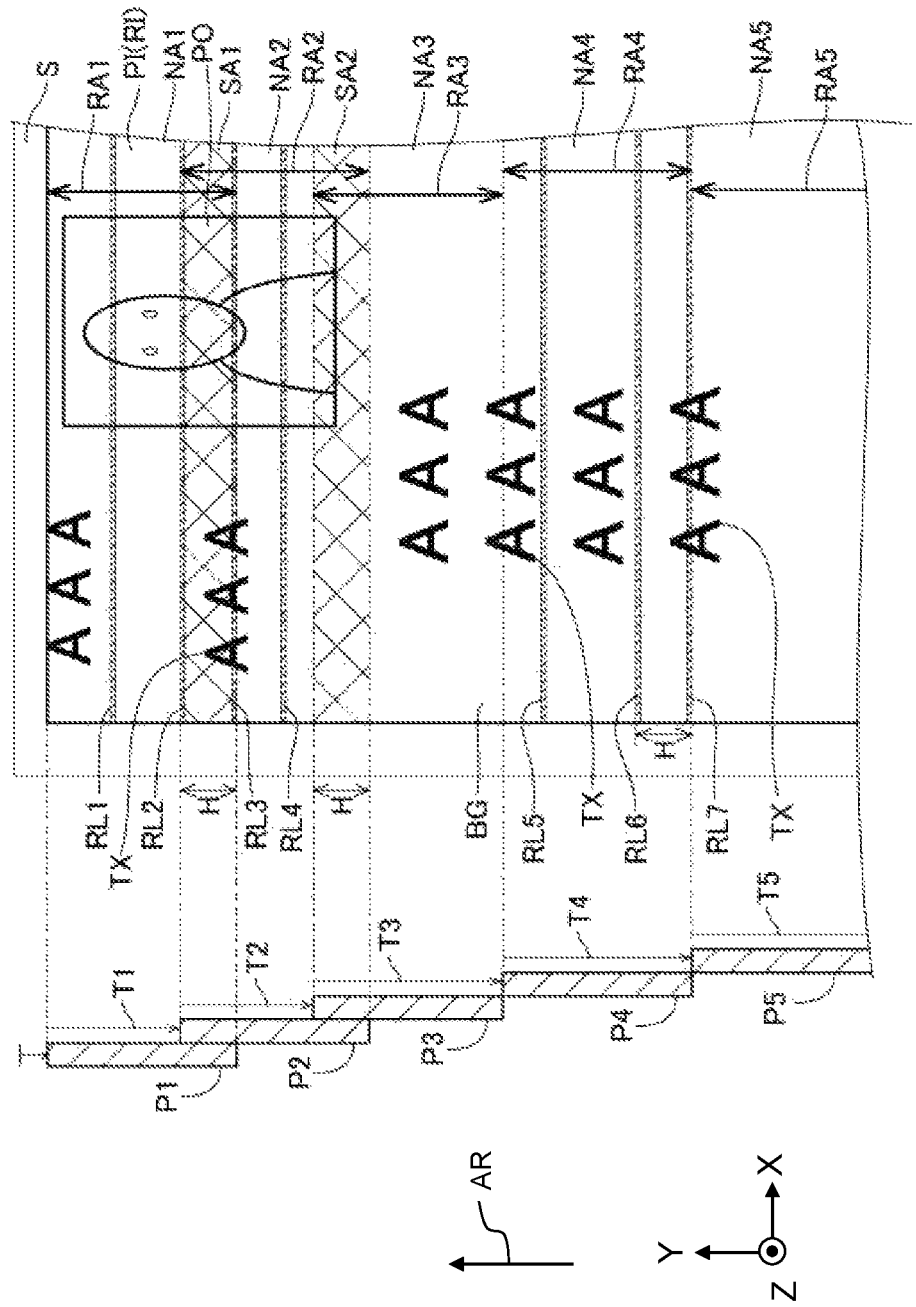
FIG. 4 depicts an example of a printing image.

FIG. 4 depicts the sheet S on which the printing image PI is printed. The printing image PI is formed by dots. Further, FIG. 4 depicts a head position P (i.e., a position in the conveyance direction of the printing head 110 relative to the sheet S) per partial printing SP (i.e., per main-scan). A pass number k (k is an integer equal to or more than one and equal to or less than m) is assigned to the partial printing SP executed a plurality of times, in its execution order. The k-th partial printing SP is also referred to as partial printing SPk. The head position P where the partial printing SPk is executed is referred to as a head position Pk. The sheet conveyance T executed between the k-th partial printing SPk and the (k+1)-th partial printing SP(k+1) is also referred to as the k-th sheet conveyance Tk. FIG. 4 depicts sheet conveyance T1 to T5 and head positions P1 to P5 corresponding to a first partial printing SP1 to a fifth partial printing SP5. An area for which printing can be executed by the partial printing SPk is referred to as a partial area RAk. FIG. 4 depicts partial areas RA1 to RA5 corresponding to the partial printing SP1 to the partial printing SP5.

In FIG. 4, the printing image PI formed on the sheet S includes one-pass areas NA1 to NA5 (areas not hatched in FIG. 4) and overlap areas SA1 and SA2 (areas hatched in FIG. 4, also referred to as two-pass areas). A length H in the conveyance direction AR of the overlap areas SA1 and SA2 is, for example, a length corresponding to five to ten pixels in an object image RI.

Dots in the one-pass areas NA1 to NA5 are formed by executing the partial printing once. Specifically, dots in the one-pass area NAk are formed by the k-th partial printing SPk (i.e., only the partial printing SPk executed in the head position Pk).

Dots in the overlap areas SA1 and SA2 are formed by executing the partial printing twice. Specifically, dots in the overlap area SAk are formed by the k-th partial printing SPk and the (k+1)-th partial printing SP(k+1). That is, the dots in the overlap area SAk are formed by the partial printing SPk executed in the head position Pk and the partial printing SP(k+1) executed in the head position (k+1).

In the example of FIG. 4, the overlap area SA1 is disposed between two one-pass areas NA1 and NA2. Similarly, the overlap area SA2 is disposed between two one-pass areas NA2 and NA3. No overlap area is disposed between two one-pass areas NA3, NA4 and between two one-pass areas NA4, NA5. Such printing is achieved by the printing process described below (FIGS. 5A and 5B).

<Printing Process>

Figure 5A:
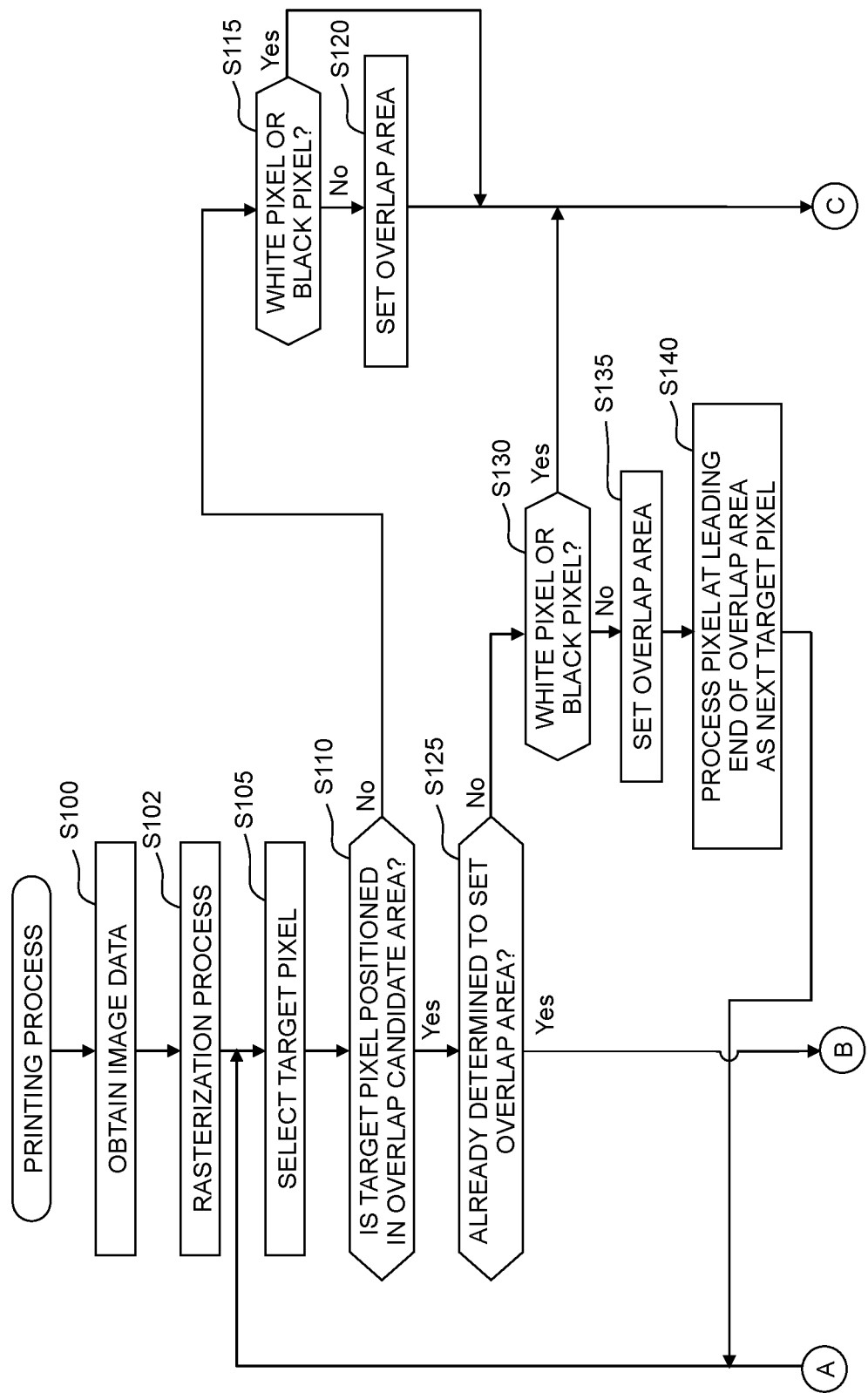
FIGS. 5A and 5B are a flowchart of a printing process.
Figure 5B:
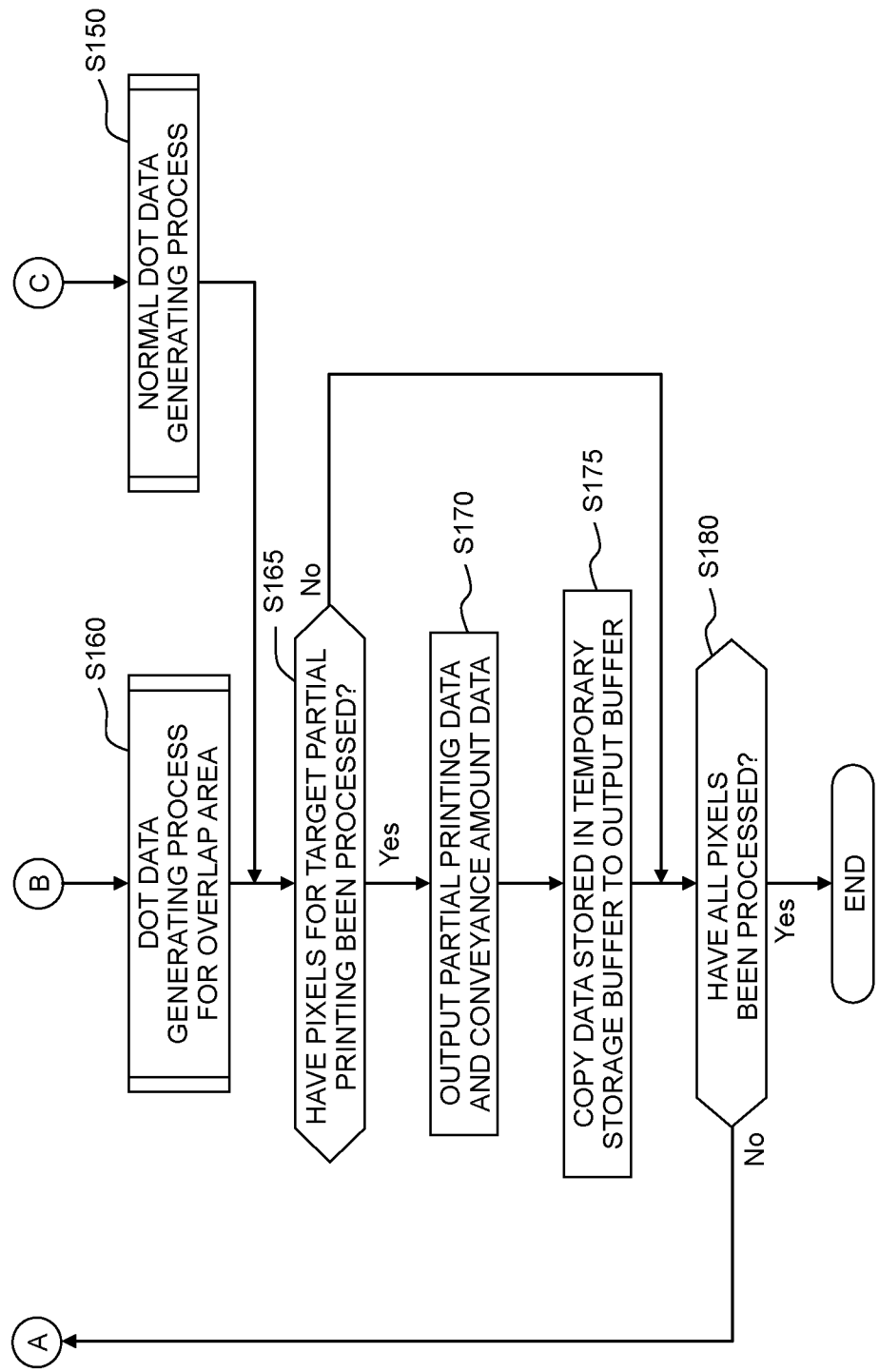

The CPU 210 (FIG. 1) of the printer 200 executes the printing process indicated in FIGS. 5A and 5B based on a printing instruction from a user. The printing instruction includes designation of image data that indicates an image to be printed. In S100, the CPU 210 obtains image data designated by the printing instruction from an external apparatus or the volatile storage 230. The image data is image data having various formats such as JPEG-compressed image data and image data described in a page-description language. In other words, in S100, the CPU 210 obtains the image data formed by pixels from the external apparatus or the volatile storage 230.

In S102, the CPU 210 rasterizes the obtained image data to generate RGB image data that indicates a color for each pixel using RGB values. The RGB image data as the object image data of this embodiment is thus obtained. The RGB values are, for example, color values including three component values of red (R), green (G), and blue (B). The number of gradations of the component values is, for example, 256 gradations.

The printing image PI of FIG. 4 is an image printed based on the object image data (RGB image data). It can be also said that FIG. 4 depicts the object image RI indicated by the object image data. The object image RI is an image formed by pixels. As depicted in FIG. 4, the object image RI includes black letters TX, a photograph PO, and a white background BG. The object image RI (FIG. 4) includes raster lines RL. In a two-dimensional coordinate system of the object image RI in FIG. 4, an up-down direction (Y direction) is a direction corresponding to the conveyance direction AR at the time of printing, and a left-right direction (X direction) is a direction corresponding to the main-scan direction at the time of printing. Thus, the up-down direction in the object image RI indicated by the object image data is also referred to as the conveyance direction in the object image RI, and the left-right direction in the object image RI is also referred to as the main-scan direction in the object image RI. In the following, a downstream side in the conveyance direction AR (an upper side in FIG. 4) is also simply referred to as a downstream side, and an upstream side in the conveyance direction AR (a lower side in FIG. 4) is also simply referred to as an upper side. Each raster line RL, which is formed by pixels, extends in the main-scan direction like raster lines RL1 to RL7 in FIG. 4.

In S105, the CPU 210 selects one target pixel. The target pixel is sequentially selected such that the object image data is processed in an order from the downstream side toward the upstream side in the conveyance direction AR when the object image RI is printed on the sheet S. Specifically, one target raster line is selected from among the raster lines RL in the object image RI. The target raster line is sequentially selected one by one from the downstream side toward the upstream side in the conveyance direction AR (i.e., from the upper side toward the lower side in FIG. 4). The target pixel is sequentially selected one by one from among the pixels forming the target raster line from one end (e.g., left end in FIG. 4) toward the other end (e.g., right end in FIG. 4) in the main-scan direction.

Here, the partial printing for forming dots that correspond to the target pixel and the target raster line is also referred to as target partial printing. However, when the target pixel and the target raster line are printed by executing the partial printing twice, that is, when the target pixel and the target raster line are positioned in the overlap area, partial printing executed first that is included in the partial printing executed twice is defined as the target partial printing. For example, when the raster lines RL1 to RL3 are the target raster lines, the target partial printing is the partial printing SP1 executed in the head position P1. An area for which printing can be executed by the target partial printing is also referred to as a target partial area. When the target partial printing is the partial printing SP1, the target partial area is the partial area RA1.

In S110, the CPU 210 determines whether the target pixel is positioned in an overlap candidate area. As described above with reference to FIG. 4, this embodiment includes a case in which the overlap area is set in an end at the upstream side of the target partial area and a case in which no overlap area is set in the end at the upstream side of the target partial area. The overlap candidate area is set as the overlap area when the CPU 210 has determined to set the overlap area. That is, the overlap candidate area is an area including the upstream end of the target partial area and having a belt-like shape with a length H in the conveyance direction AR. For example, when each of the raster lines RL2, RL3, RL6, and RL7 depicted in FIG. 4 is the target raster line including the target pixel, the CPU 210 determines that the target pixel is positioned in the overlap candidate area. When each of the raster lines RL1, RL4, and RL5 depicted in FIG. 4 is the target raster line including the target pixel, the CPU 210 determines that the target pixel is not positioned in the overlap candidate area.

When the target pixel is not positioned in the overlap candidate area (S110: NO), the CPU 210 determines in S115 whether the target pixel is a pixel indicating a white color (white pixel) or a pixel indicating a black color (black pixel) based on values of the target pixel (RGB values). In other words, a specifying condition is that a specified pixel is the pixel indicating the black color or the pixel indicating the white color. The white pixel is a pixel indicating a white color. The white pixel of this embodiment has RGB values of (255, 255, 255). The black pixel is a pixel indicating a black color. The black pixel of this embodiment has RGB values of (0, 0, 0). A pixel that is neither the white pixel nor the black pixel is also referred to as an intermediate color pixel.

When the target pixel is neither the white pixel nor the black pixel, that is, when the target pixel is the intermediate color pixel (S115: NO), the CPU 210 determines to set the overlap area in the upstream end of the target partial area (S120), and proceeds to S150. That is, the overlap candidate area having the length H in the conveyance direction AR is set as the overlap area. When the target pixel is the white pixel or the black pixel (S115: YES), the CPU 210 skips S120 and proceeds to S150.

When the target pixel is positioned in the overlap candidate area (S110: YES), the CPU 210 determines whether it has been already determined to set the overlap area in the upstream end of the target partial area (S125). In this embodiment, before the pixel in the overlap candidate area is processed as the target pixel, the CPU 210 may determine to set the overlap area in the upstream end of the target partial area when a pixel at the downstream side of the overlap candidate area is processed as the target pixel (S120).

When the CPU 210 has already determined to set the overlap area (S125: YES), the CPU 210 proceeds to S160.

When the CPU 210 has not yet determined to set the overlap area (S125: NO), the CPU 210 determines whether the target pixel is the white pixel or the black pixel based on a value of the target pixel (S130). When the target pixel is the white pixel or the black pixel (S130: YES), the CPU 210 proceeds to S150.

When the target pixel is neither the white pixel nor the black pixel (i.e., when the target pixel is the intermediate color pixel) (S130: NO), the CPU 210 determines to set the overlap area in the upstream end of the target partial area (S135). In S140, the CPU 210 determines to process a pixel at a leading end (the forefront or the beginning) of the overlap area that has been set, as the next target pixel, and returns to S105. That is, in this case, the leading pixel (the pixel at the forefront or beginning) of the overlap area is selected as the target pixel in S105. For example, the leading pixel of the overlap area SA1 in FIG. 4 is a pixel at a left end of the raster line RL2, which is positioned at the most downstream of the overlap area SAE In S150, the CPU 210 executes a normal dot data generating process. In the normal dot data generating process, pieces of dot data of dots of to be formed in one-pass area (e.g., NA1 to NA5 in FIG. 4) for the target pixel are generated. The normal dot data generating process is described below.

In S160, the CPU 210 executes a dot data generating process for the overlap area. In the dot data generating process for the overlap area, pieces of dot data of dots to be formed in the overlap area (e.g., SA1 and SA2 in FIG. 4) for the target pixel are generated. The dot data generating process for the overlap area is described below.

In S165, the CPU 210 determines whether all the pixels for the target partial printing have been processed as the target pixels. For example, it is assumed that the partial printing SP1 executed in the head position P1 is the target partial printing. In this case, when a pixel at a right end of the raster line RL3 included in the raster lines RL corresponding to the head position P1 and positioned at the most upstream side in the conveyance direction AR is the target pixel, the CPU 210 determines that all the pixels for the target partial printing have been processed.

When all the pixels for the target partial printing have been processed (S165: YES), pieces of dot data for the target partial printing have been already stored in an output buffer at this time. In this case, the CPU 210 outputs the pieces of dot data for the target partial printing as the pieces of partial printing data to the printing mechanism 100 (S170). Before the pieces of partial printing data are output, conveyance amount data, which indicates a conveyance amount of the sheet conveyance T to be executed after the target partial printing, is added to each piece of partial printing data.

When the CPU 210 sets the overlap area in the upstream end of the target partial area, the conveyance amount of the sheet conveyance T executed immediately after the target partial printing is set to a first amount (D−H). The first amount is an amount obtained by subtracting the length H in the conveyance direction AR of the overlap area from the nozzle length D (FIG. 3). For example, in this embodiment, the length H in the conveyance direction AR of the overlap area corresponds to six pixels. The length of one pixel is equal to the nozzle interval NT, and thus H=(6×NT) is satisfied in this embodiment.

When the CPU 210 sets no overlap area in the upstream end of the target partial area, the conveyance amount of the sheet conveyance T executed immediately after the target partial printing is set to a second amount (D−α). The second amount is an amount obtained by subtracting α from the nozzle length D (FIG. 3). α is an adjustment amount, for example, a value that is about 0.2 to 2 times the nozzle interval NT. In this embodiment, α is a value that is 0.5 times the nozzle interval NT. The adjustment amount α is shorter than the length H, and thus the second amount (D−α) is longer than the first amount (D−H).

In S175, the CPU 210 deletes, from the output buffer, the pieces of partial printing data that have been already output, and copies pieces of data stored in a temporary storage buffer to the output buffer. For example, at the time at which the pixels of the raster line RL3 positioned at the most upstream side in the head position P1 of FIG. 4 have been processed, the pixels included in the pixels corresponding to the head position P2 and positioned in the overlap area SA1 have already been processed. Further, pieces of data included in the pieces of dot data corresponding to the processed pixels and used for the partial printing SP2 executed in the head position P2 have already been stored in the temporary storage buffer. In S175, those pieces of data are copied to the output buffer.

When there is a pixel that has not yet been processed for the target partial printing (S165: NO), the CPU 210 skips S170 and S175.

In S180, the CPU 210 determines whether all the pixels in the object image RI have been processed as the target pixels. When there is a pixel that has not yet been processed (S180: NO), the CPU 210 returns to S105 and selects the pixel that has not been processed as the target pixel. When all the pixels in the object image RI have been processed (S180: YES), the CPU 210 ends the printing process.

<Normal Dot Data Generating Process>

Figure 6:
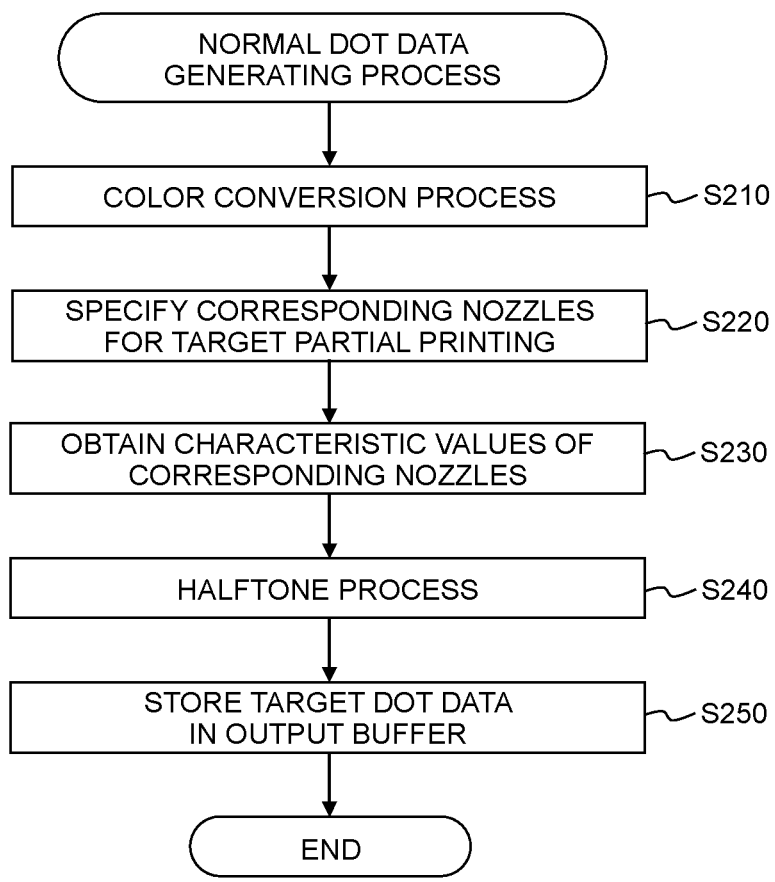
FIG. 6 is a flowchart of a normal dot data generating process.

Referring to FIG. 6, the normal dot data generating process in S150 of FIG. 5B is explained. In S210, the CPU 210 executes a color conversion process for the target pixel. In the color conversion process, the RGB values of the target pixel are converted into CMYK values. The CMYK values are color values including component values (component values of C, M, Y, and K in this embodiment) corresponding to inks & used for printing. The number of gradations of each of the component values of C, M, Y, and K is, for example, 256 gradations. The color conversion process is executed while referring to, for example, a publicly-known look up table.

In S220, the CPU 210 specifies corresponding nozzles for the target partial printing. That is, when the target partial printing is executed, the CPU 210 specifies the nozzles NZ used for forming dots of C, M, Y, and K that corresponds to the target pixel, based on the position in the conveyance direction AR of the target pixel of the object image RI.

In S230, the CPU 210 obtains characteristic values of the corresponding nozzles of C, M, Y, and K. The characteristic values of the corresponding nozzles are obtained from a nozzle characteristic table (not depicted) that is stored in the non-volatile storage 220 in advance. In the nozzle characteristic table, the characteristic values of the nozzles NZ are recorded while being associated with nozzle numbers. The amounts of inks discharged from the respective nozzles NZ vary depending on a production error of the nozzles NZ, a production error of piezoelectric elements for driving the nozzles NZ, and the like. Thus, the dots formed by inks discharged from the respective nozzles NZ have different sizes, and thus have various densities. The characteristic value of each nozzle NZ indicates a difference between a density expressed by the dot formed by each nozzle NZ and a reference density (average density). The characteristic value of each nozzle NZ is a value that is experimentally defined through the measurement of density of an image printed by actually using each nozzle.

In S240, the CPU 210 executes a halftone process for the target pixel. The half tone process converts the CMYK values of the target pixel to pieces of dot data. The pieces of dot data indicate dot formation states of the color components of CMYK for each pixel. For example, a value of each pixel of the dot data indicates a dot formation state having two gradations ("no dot" and "with dot"). Alternatively, a value of each pixel of the dot data indicates a dot formation state having four gradations ("no dot", "small", "medium", and "large").

In the halftone process of this embodiment, the characteristic values of the corresponding nozzles obtained in S230 are used. For example, the CPU 210 corrects relative density values used in an error diffusion method by using the characteristic values of the corresponding nozzles. The CPU 210 executes the halftone process in accordance with the error diffusion method by using the relative density values after correction, and converts the CMYK values of the target value into the pieces of dot data. Accordingly, the relative density values used in the error diffusion method can vary depending on the characteristics of the nozzles NZ, thus resulting in an appropriate density of an image to be printed. This inhibits, for example, density unevenness in the printing image PI due to the variation in characteristics of the nozzles NZ.

In S250, the CPU 210 stores the pieces of dot data corresponding to the target pixel (also referred to as pieces of target dot data) in the output buffer, and ends the normal dot data generating process.

<Dot Data Generation Process for Overlap Area>

Figure 7:
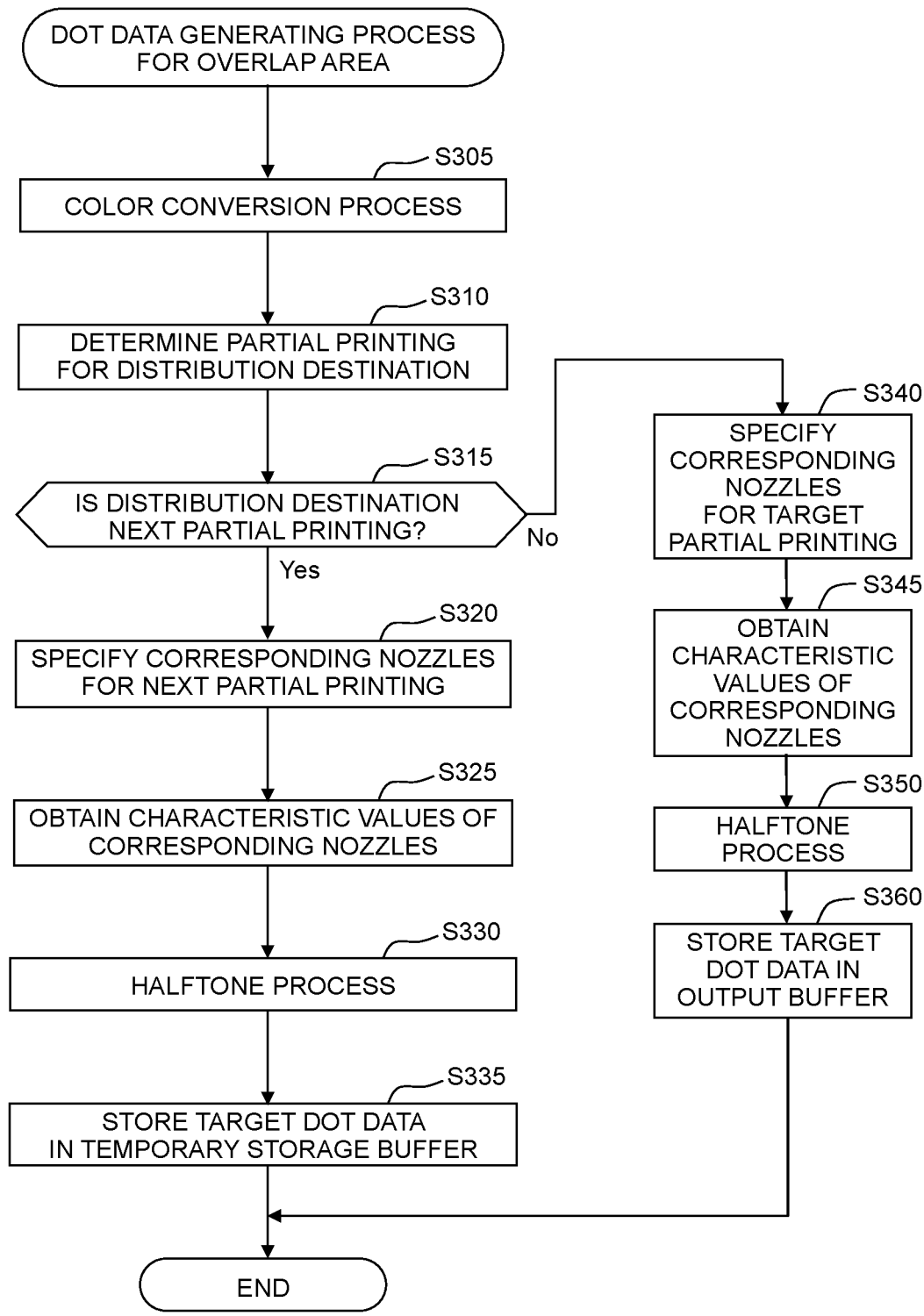
FIG. 7 is a flowchart of a dot data generating process for an overlap area.

Referring to FIG. 7, the dot data generating process for the overlap area indicated in S160 of FIG. 5B is explained. Similar to S210 of FIG. 6, the CPU 210 executes the color conversion process on the target pixel (S305).

In the overlap area, the dots corresponding to the target pixel may be formed by the target partial printing or partial printing executed after the target partial printing. Thus, the CPU 210 determines which of the target partial printing and the next partial printing (partial printing executed after the target partial printing) is executed as partial printing for a distribution destination of the dots corresponding to the target pixel (S310). Specifically, the CPU 210 obtains distribution pattern data PD corresponding to the target raster line, and determines the partial printing for the distribution destination in accordance with the distribution pattern data PD.

Figure 8A:
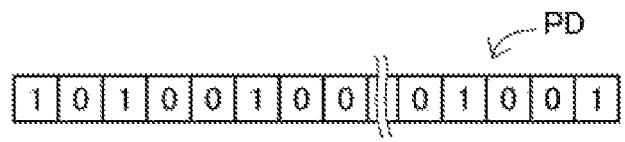
FIG. 8A depicts a distribution pattern data.

As depicted in FIG. 8A, the distribution pattern data PD is binary data having a value that corresponds to each pixel of the target raster line. A value "0" of the distribution pattern data PD indicates that dots corresponding to the pixel are formed by the target partial printing, that is, the partial printing for the distribution destination of the dots is the target partial printing. A value "1" of the distribution pattern data PD indicates that dots corresponding to the pixel are formed by the next partial printing, that is, the partial printing for the distribution destination of the dots is the next partial printing.

Figure 8B:
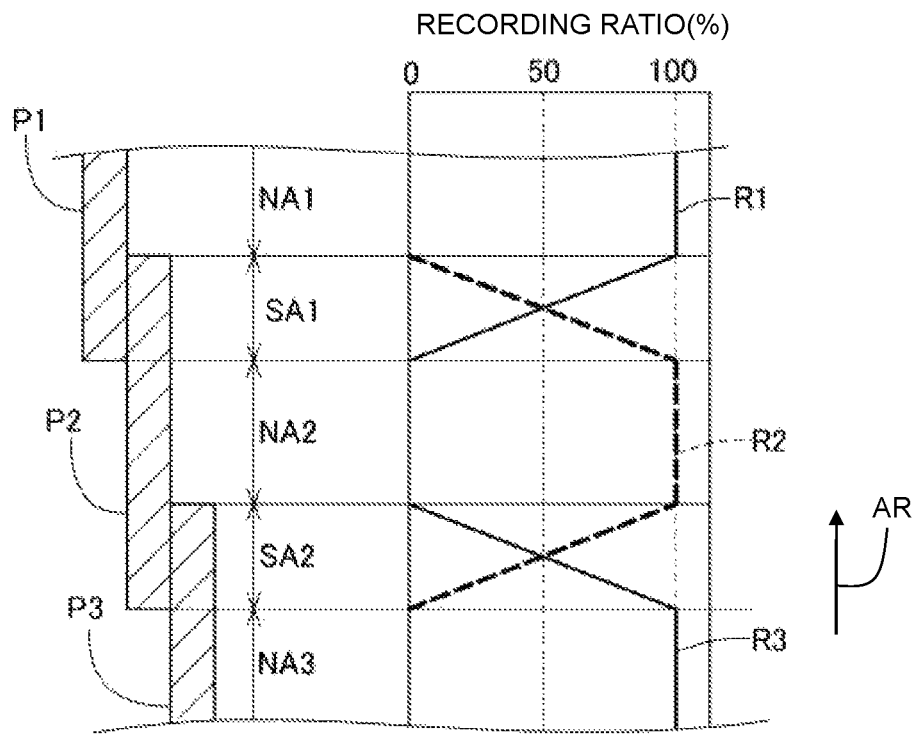
FIG. 8B depicts recording ratios of partial printing in different head positions.

Here, recording ratios R1, R2, and R3 in FIG. 8B are recording ratios of the partial printing SP1, SP2, and SP3 in the head positions P1, P2, and P3. FIG. 8B depicts each of the recording ratios R1, R2, and R3 with respect to the position in the conveyance direction AR. In a range in the conveyance direction AR corresponding to the one-pass area NA1 (FIG. 4), the recording ratio R1 is 100%. Similarly, in ranges in the conveyance direction AR corresponding to the one-pass areas NA2 and NA3 (FIG. 4), the recording ratios R2 and R3 are 100%.

In a range in the conveyance direction AR corresponding to the overlap area SA1 (FIG. 4), the recording ratio R1 linearly decreases toward the upstream side in the conveyance direction AR (lower side in FIG. 8B). In the range in the conveyance direction AR corresponding to the overlap area SA1 (FIG. 4), the recording ratio R2 linearly decreases toward the downstream side in the conveyance direction AR (upper side in FIG. 8B). In the range in the conveyance direction AR corresponding to the overlap area SA1 (FIG. 4), the sum of the recording ratio R1 and the recording ratio R2 is 100%. The same is applied to the recording ratios R2 and R3 in a range in the conveyance direction AR corresponding to the overlap area SA2 (FIG. 4).

In S315, the CPU 210 determines whether the distribution destination of the dots corresponding to the target pixel is the next partial printing. When the distribution destination is the next partial printing (S315: YES), the CPU 210 specifies the corresponding nozzles used in the next partial printing (S320). That is, the CPU 210 specifies, based on the position in the conveyance direction AR of the target pixel in the object image RI, the nozzles NZ used in the next partial printing for forming the dots of C, M, Y, and K corresponding to the target pixel.

In S325, the CPU 210 obtains the characteristic values of the corresponding nozzles of C, M, Y, and K, from the nozzle characteristic table described above. In S330, the CPU 210 executes the halftone process on the target pixel to generate pieces of target dot data corresponding to the target pixel. In the halftone process, similar to S240 of FIG. 6, the characteristic values of the corresponding nozzles obtained in S325 are used. In S335, the CPU 210 stores the pieces of target dot data in the temporary storage buffer, and generates pieces of dot data for the overlap area.

When the distribution destination is the target partial printing (S315: NO), the CPU 210 executes S340 to S360. The processes of S340 to 360 are the same as the processes of S220 to S250 in FIG. 6.

Referring to FIG. 9A to FIG. 10B, the object image RI and the printing image PI according to this embodiment are further explained. Since the object image RI represented by the RGB image data corresponds to the printing image PI printed on the sheet S, the object image and the printing image are depicted by the same diagrams in FIG. 9A to FIG. 10B.

Figure 9A:
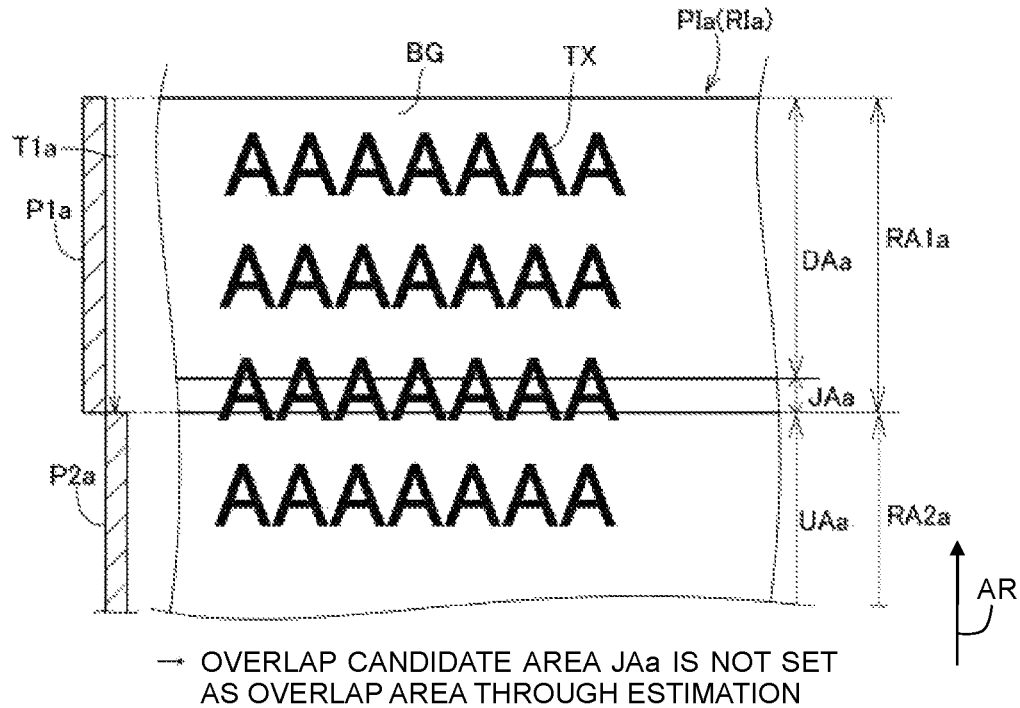
FIGS. 9A and 9B are a first diagram each indicating an exemplary object image and an exemplary printing image.

In an object image RIa and a printing image PIa of FIG. 9A, a partial area RA1a corresponding to partial printing executed in a head position P1a includes an overlap candidate area JAa that includes an upstream end of the partial area RA1a and a downstream portion DAa positioned downstream of the overlap candidate area JAa. Further, the object image RIa and the printing image PIa include an upstream portion UAa positioned upstream of the overlap candidate area JAa.

Figure 9B:
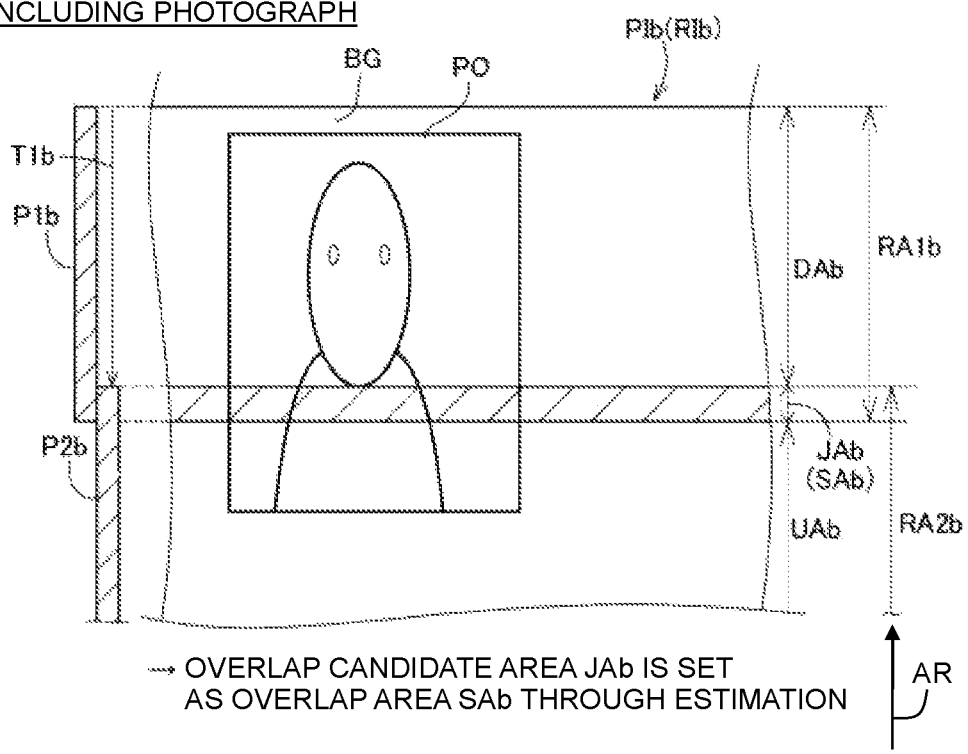

In an object image RIb and a printing image PIb depicted in FIG. 9B, a partial area RA1b corresponding to partial printing executed in a head position P1b includes an overlap candidate area JAb including an upstream end of the partial area RA1b and a downstream portion DAb positioned downstream of the overlap candidate area JAb. Further, the object image RIb and the printing image PIb include an upstream portion UAb positioned upstream of the overlap candidate area JAb.

In the example of FIG. 9B, the overlap candidate area JAb includes an object different from the black letter TX, specifically, the photograph PO. In this case, the overlap candidate area JAb is preferably set as an overlap area SAb. That is, as depicted in FIG. 9B, the image in the overlap candidate area JAb is preferably printed by the partial printing executed in the head position P1b and the next partial printing executed in the head position P2b (corresponding to a partial area RA2b).

The reason thereof is as follows. That is, the conveyance amount of the sheet S may vary. If the overlap area SAb is not provided, the variation in the conveyance amount may make an interval between an upstream end of the overlap candidate area JAb and a downstream end of the upstream portion UAb excessively large or small. In this case, banding such as a white streak and black streak may be caused. Providing the overlap area SAb inhibits the white streak and black streak. In the overlap area SAb, the dots on one raster line are formed by executing the partial printing twice, and thus it is possible to inhibit all the dots on one raster line from being shifted from all the dots on any other raster line.

In the example of FIG. 9A, the overlap candidate area JAa only includes the black letters TX. In this case, it is preferable that the overlap candidate area JAa is not set as the overlap area. That is, as depicted in FIG. 9A, it is preferable that the overlap candidate area JAa is printed by executing the partial printing once in the head position P1a and that the overlap candidate area JAa is not printed by the next partial printing in the head position P2a (corresponding to a partial area RA2a).

The reason thereof is as follows. That is, when the overlap candidate area JAa only includes the black letters TX, and when an interval between an upstream end of the overlap candidate area JAa and a downstream end of the upstream portion UAa is excessively narrow, black dots at the upstream end of the overlap candidate area JAa may largely or excessively overlap with black dots at the downstream end of the upstream portion UAa. However, black is a color having the highest density. Thus, even when the overlap between the black dots representing the black letters TX is large, the overlap portion is inconspicuous. This is because there is no color having higher density than black. This causes no image quality problem even when the interval between the upstream end of the overlap candidate area JAa and the downstream end of the upstream portion UAa is excessively narrow. On the other hand, when the interval between the upstream end of the overlap candidate area JAa and the downstream end of the upstream portion UAa is excessively large, it is generated a gap between the black dots positioned at the upstream end of the overlap candidate area JAa and the black dots positioned at the downstream end of the upstream portion UAa, and the white streak caused thereby is conspicuous. As described above, when the overlap candidate area JAa only includes the black letters TX, the narrow interval between the upstream end of the overlap candidate area JAa and the downstream end of the upstream portion UAa is allowed, but the large interval is not allowed. In view of the above, when the overlap candidate area is not set as the overlap area in this embodiment, the conveyance amount of the sheet S immediately after the partial printing executed in the head position P1a is set to the second amount (D-a), which is shorter than the nozzle length D by the adjustment amount α. Accordingly, when the overlap candidate area JAa only includes the black letters TX, the white streak is inconspicuous in the configuration of this embodiment. That is, any image quality problem is inhibited without setting the overlap area, making it possible to set the conveyance amount of the sheet S long. Further, the number of times of partial printing required may be reduced, thereby shortening the printing time.

Like the example of FIG. 9B, when the overlap candidate area JAb includes an object different from the black letters, the white streak(s) and the black streak(s) may be conspicuous. In this case, the image quality problem can not be solved through the same manner, and thus the overlap area is preferably provided as described above.

In the example of FIG. 9A, the downstream portion DAa only includes the black letters TX as the object. In this case, the overlap candidate area JAa is also likely to include the black letters TX only. As described above, in the example of FIG. 9A, the overlap candidate area JAa also includes the black letters TX only. On the other hand, in the example of FIG. 9B, the downstream portion DAb includes the object different from the black letters TX, specifically, the photograph PO. In this case, the overlap candidate area JAb is also likely to include the object different from the black letters TX. As descried above, in the example of FIG. 9B, the overlap candidate area JAb also includes the photograph PO. This is because, since a length in the conveyance direction AR of the downstream portion is relatively long (e.g., a length corresponding to hundreds of pixels) and a length in the conveyance direction AR of the overlap candidate area is relatively short (e.g., a length corresponding to six pixels), the downstream portion and the overlap candidate area adjacent to the downstream portion are highly likely to have similar images.

As described above, the objects in the overlap candidate areas JAa and JAb can be estimated based on the downstream portions DAa and DAb. For example, as depicted in FIG. 9A, when the downstream portion DAa only includes the black letters TX, the CPU 210 can estimate that the overlap candidate area JAa also includes the black letters TX only. As depicted in FIG. 9B, when the downstream portion DAb includes the object different from the black letters TX, the CPU 210 can estimate that the overlap candidate area JAb also includes the object different from the black letters TX. In a typical digital image, the black letters TX are formed only by black pixels. Thus, an area only including the black letters TX is formed only by black pixels forming the black letters TX and white pixels forming the background BG. Thus, when the downstream portion (e.g., DAa) of the object image RI is formed only by black pixels and white pixels, the CPU 210 can determine that the downstream portion only includes the black letters TX. When the downstream portion (e.g., DAb) of the object image RI includes intermediate color pixels different from the black pixels and white pixels, the CPU 210 can determine that the downstream portion includes the object different from the black letters TX.

By using the above configuration, in this embodiment, the CPU 210 determines whether the overlap candidate areas JAa and JAb are set as the overlap areas based on pieces of data included in the RGB image data and indicating the downstream portions DAa and DAb. That is, the CPU 210 determines whether the overlap candidate areas JAa and JAb include the black letters TX as the objects not using pieces of data included in the RGB image data and corresponding to the overlap candidate areas JAa and JAb but using pieces of data included in the RGB image data and indicating the downstream portions DAa and DAb.

Specifically, the CPU 210 determines whether the target pixel is the black pixel and the white pixel (S115 in FIG. 5A) when the target pixel in the downstream portion is being processed (NO: S110 in FIG. 5A). When the target pixel is the intermediate color pixel different from the black pixel and the white pixel (S115: NO), the overlap candidate area is set as the overlap area (S120). In other words, when the downstream portion includes at least one intermediate color pixel, the overlap candidate area is set as the overlap area. When the downstream portion is formed only by the black pixels and the white pixels, the overlap candidate area is not set as the overlap area. That is, the CPU 210 generates the first partial printing data and the second partial printing data such that at least a part of each of the downstream portions DAa and DAb is printed by the first partial printing, at least a part of each of the upstream portions UAa and UAb is printed by the second partial printing, and each of the overlap candidate areas JAa and JAb is printed by the first partial printing and the second partial printing.

Thus, in the example of FIG. 9A, the CPU 210 determines that the overlap candidate area JAa is not set as the overlap area before the pixel in the overlap candidate area JAa is processed as the target pixel. As a result, when the pixel in the overlap candidate area JAa is processed as the target pixel, pieces of appropriate dot data can be generated promptly in the normal dot data generating process in S150.

In the example of FIG. 9B, the CPU 210 determines that the overlap candidate area JAb is set as the overlap area SAb before the pixel in the overlap candidate area JAb is processed as the target pixel. Thus, when the pixel in the overlap candidate area JAb is processed as the target pixel, pieces of appropriate dot data can be generated promptly in the dot data generating process for the overlap area in S160.

As understood from the above explanation, in this embodiment, the CPU 210 estimates whether the overlap candidate areas JAa and JAb satisfy the specifying condition not using the pieces of data included in the object image data and corresponding to the overlap candidate areas JAa and JAb but using the pieces of data included in the object image data and corresponding to the downstream portions DAa and DAb (S115 in FIG. 5A). In this embodiment, the specifying condition is that the overlap candidate areas JAa and JAb are formed only by the white pixels and the black pixels. When the CPU 210 has estimated that the overlap candidate area JAb does not satisfy the specifying condition (NO: S115 in FIG. 5A), the CPU 210 sets the overlap area SAb. That is, the CPU 210 generates the first partial printing data for the first partial printing and the second partial printing data for the second partial printing (S150, S160 in FIG. 5B) such that the downstream portion DAb is printed by the first partial printing (former partial printing), the upstream portion UAb is printed by the second partial printing (latter partial printing), and the overlap candidate area JAb is printed by the first partial printing and the second partial printing. The conveyance amount in sub-scan (conveyance of the sheet S) between the first partial printing and the second partial printing is set to the first amount (D-H). In other words, when the CPU 210 has estimated that the overlap candidate area JAb does not satisfy the specifying condition (NO: S115 in FIG. 5A), the CPU 210 prints the overlap candidate area JAb by the first partial printing process and the second partial printing process.

When the CPU 210 has estimated that the overlap candidate area JAb satisfies the specifying condition (YES: S115 in FIG. 5A for all the pixels in the downstream portion DAb), the CPU 210 sets no overlap area. That is, the CPU 210 generates the first partial printing data and the second partial printing data (S150 in FIG. 5B) such that the downstream portion DAa is printed by the first partial printing, the upstream portion UAa is printed by the second partial printing, and the overlap candidate area JAa is printed by the first partial printing and is not printed by the second partial printing. In other words, when the CPU 210 has estimated that the overlap candidate area JAb satisfies the specifying condition (YES: S115 in FIG. 5A), the CPU 210 prints the overlap candidate area JAb by one of the first partial printing process and the second partial printing process. The conveyance amount in sub-scan between the first partial printing and the second partial printing is set to the second amount (D-a) larger than the first amount (D-H). In other words, when the CPU 210 has determined that the downstream portion DAa satisfies the specifying condition, the CPU 210 makes the conveyance amount of the sheet S by the conveyor 140 between the first partial printing and the second partial printing larger than the case in which the CPU 210 has determined that the downstream portion DAa does not satisfy the specifying condition.

In the above configuration, when the specifying condition is not satisfied, the overlap area is provided. This inhibits banding such as white streaks and black streaks. When the specifying condition is satisfied, no overlap area is provided. This makes the conveyance amount of the sheet S larger than the case in which the specifying condition is not satisfied, thus inhibiting the decrease in printing speed. As a result, it is possible to inhibit both the decrease in printing speed and the decrease in image quality. Further, the CPU 210 estimates whether the specifying condition is satisfied not using the pieces of data corresponding to the overlap candidate areas JAa and JAb but using the pieces of data corresponding to the downstream portion DAa and DAb. It is thus possible to inhibit both the decrease in partial printing data generating speed and the decrease in printing speed.

It is assumed that pieces of dot data corresponding to the pixel in the overlap candidate area are generated, after the pixel in the overlap candidate area is analyzed and it is determined whether the image in the overlap candidate area is formed only by black pixels and white pixels. In this case, extra time for analyzing the pixel in the overlap candidate area is required. Here, it is assumed that, for setting the overlap area, the dot data generating process for the overlap area is executed on the pixel in the overlap candidate area, and the CPU 210 determines not to set the overlap area when the CPU 210 has determined that no intermediate color pixel is included in the overlap candidate area. In this case, the pieces of dot data generated in the dot data generating process for the overlap area are required to be deleted and the normal dot data generating process is required to be re-executed. This is because the dot data generating process for the overlap area (FIG. 7) is different from the normal dot data generating process (FIG. 6), as described above. Especially, in this embodiment, the half tone process using the characteristic values of the corresponding nozzles is executed. Thus, the pieces of dot data generated in the normal dot data generating process are different from the pieces of dot data generated in the dot data generating process for the overlap area (FIG. 7). In any case, the time for generating the pieces of partial printing data is elongated, which may elongate the printing time. In this embodiment, such inconvenience is inhibited, and thus the printing time is inhibited from being elongated.

In this embodiment, the second amount, which is the conveyance amount of the sheet conveyance T when no overlap area is provided, is the amount (D-a) smaller than the nozzle length D. It is thus possible to inhibit the white streak from being formed between the overlap candidate area JAa and the upstream portion UAa, as described above.

In this embodiment, the CPU 210 estimates that the downstream portion DAa satisfies the specifying condition (S115 in FIG. 5A, FIG. 9A), when the downstream portion DAa includes only the black pixels and the white pixels, in other words, when pieces of partial printing data included in the RGB image data and corresponding to the downstream portion DAa only include pieces of pixel data indicating the black color that is the color of black ink and pieces of pixel data indicating the white color expressed or represented by a color of the sheet S. It is thus possible to appropriately estimate whether the overlap candidate area JAa satisfies the specifying condition. For example, the CPU 210 can estimate that the overlap candidate area JAa satisfies the specifying condition, when the overlap candidate area JAa is formed only by the black color that is expressed by the black ink and has the highest density. In that case, the CPU 210 can estimate that the overlap candidate area JAa satisfies the specifying condition, provided that banding is not caused without providing the overlap area.

Here, there is possibility that the estimation based on the downstream portion may include an error. This embodiment includes a process for solving such an estimation error, and explanation thereof is made below with reference to FIGS. 10A and 10B.

In an object image RIc and a printing image PIc of FIG. 10A, a partial area RA1$c$ corresponding to partial printing executed in a head position PIc includes an overlap candidate area JAc including an upstream end of the partial area RA1$c$ and a downstream portion DAc positioned downstream of the overlap candidate area JAc. Further, the object image RIc and the printing image PIc include an upstream portion UAc positioned upstream of the overlap candidate area JAc.

In the example of FIG. 10A, the overlap candidate area JAc includes an object different from the black letters TX, specifically, the photograph PO. In this case, as described above, the overlap candidate area JAc is preferably set as the overlap area SAc. That is, as depicted in FIG. 10A, the image in the overlap candidate area JAc is preferably printed by partial printing executed in the head position PIc and the next partial printing (corresponding to a partial area RA2$c$) executed in a head position PIc.

However, in the example of FIG. 10A, the downstream portion DAc only includes the black letters TX as the object. Thus, the overlap candidate area JAc is not set as the overlap area SAc in the estimation process executed before the pixel in the overlap candidate area JAc is processed. That is, the estimation based on the downstream portion DAc is not executed normally or correctly. In this embodiment, when the pixel in the overlap candidate area JAc is processed as the target pixel (YES: S110 in FIG. 5A), and when the overlap candidate area JAc has not been set as the overlap area SAc (NO: S125 in FIG. 5A), the CPU 210 determines whether the target pixel is the white pixel or the black pixel (S130 in FIG. 5A). That is, the CPU 210 determines whether the target pixel in the overlap candidate area JAc in the RGB image data is the white pixel or the black pixel, after generation of the first partial printing data is started such that the overlap candidate area JAc is printed by the first partial printing and is not printed by the second partial printing. In other words, when the CPU 210 has determined that the downstream portion DAc satisfies the specifying condition, the CPU 210 tentatively determines that the overlap candidate area JAc is printed by one of the first partial printing process and the second partial printing process. When the target pixel is neither the white pixel nor the black pixel, that is, when the target pixel is the intermediate color pixel (NO: S130 in FIG. 5A), the CPU 210 sets the overlap candidate area JAc as the overlap area SAc (S135 in FIG. 5A), and determines a pixel at a leading end of the overlap area SAc as the next target pixel (S140 in FIG. 5A). That is, after the above tentative determination, the CPU 210 selects the pixel in the overlap candidate area JAc as the target pixel (YES: S105, S110 in FIG. 5A), determines whether the target pixel in the overlap candidate area JAc is the white pixel or the black pixel, and determines that the overlap candidate area JAc is printed by the first partial printing process and the second partial printing process (S135 in FIG. 5A) when the target pixel is neither the white pixel nor the black pixel (NO: S130 in FIG. 5A).

As understood from the above explanation, in this embodiment, when the CPU 210 has estimated that the overlap candidate area JAc satisfies the specifying condition, the CPU 210 starts generation of pieces of the partial printing data of the pixel in the overlap candidate area JAc without setting the overlap area SAc, and then determines whether the overlap candidate area JAc satisfies the specifying condition by using the pieces of data included in the object image data and corresponding to the overlap candidate area JAc (S130 in FIG. 5A). When the CPU 210 has determined that the overlap candidate area JAc does not satisfy the specifying condition (NO: S130 in FIG. 5A), the CPU 210 sets the overlap area SAc and regenerates partial printing data for the overlap area SAc (S140, S160 in FIGS. 5A and 5B).

It is assumed that the estimation is not executed normally or correctly (i.e., it is assumed that the overlap candidate area JAc does not actually satisfy the specifying condition). In this case, image quality may deteriorate when the overlap area SAc is not set. In this embodiment, the overlap area SAc is set to regenerate the pieces of partial printing data for the overlap area SAc. Thus, although the generating speed of the pieces of partial printing data may be decreased, deterioration in image quality of the printing image can be inhibited.

In an object image RId and a printing image PId in FIG. 10B, a partial area RA1$d$ corresponding to partial printing executed in a head position P1$d$ includes an overlap candidate area JAd including an upstream end of the partial area RA1$d$ and a downstream portion DAd positioned downstream of the overlap candidate area JAd. Further, the object image RId and the printing image PId include an upstream portion UAd positioned upstream of the overlap candidate area JAd.

In the example of FIG. 10B, the overlap candidate area JAd only includes the black letters TX. In this case, as described above, the overlap candidate area JAd is preferably not set as the overlap area SAd.

However, in the example of FIG. 10B, the downstream portion DAd includes an object different from the black letters TX (specially, the photograph PO) as the object. The overlap candidate area JAd is thus set as the overlap area SAd in the estimation process executed before the pixel in the overlap candidate area JAd is processed. That is, the estimation based on the downstream portion DAd is not executed normally or correctly. In this embodiment, when the pixel in the overlap area SAd is processed as the target pixel (YES: S110 in FIG. 5A), and when the overlap candidate area JAd has been set as the overlap area SAd (YES: S125 in FIG. 5A), the CPU 210 does not determine whether the target pixel is the white pixel or the black pixel even when the estimation is not executed normally or correctly. In other words, the CPU 210 does not determine whether the target pixel is the white pixel or the black pixel, when the CPU 210 has determined that the overlap candidate area JAc is printed by the first partial printing process and the second partial printing process. Thus, in this case, pieces of partial printing data for the overlap area SCd are generated in a state where the overlap area SAd is set (S160 in FIG. 5B), and then printing is executed. That is, the overlap SCd is printed by the partial printing executed in the head position P1d and the next partial printing (corresponding to a partial area RA2d) in a head position P2d.

As understood from the above explanation, in this embodiment, when the CPU 210 has estimated that the overlap candidate area JAd does not satisfy the specifying condition, the CPU 210 does not regenerate the pieces of partial printing data even when the overlap candidate area JAd actually satisfies the specifying condition. Printing is executed in a state where the setting of the overlap area SCd is maintained.

When the CPU 210 has estimated that the overlap candidate area JAd does not satisfy the specifying condition, the CPU 210 sets the overlap area SCd. In this case, even when the estimation is not executed normally or correctly, image deterioration is not caused. If the pieces of partial printing data are regenerated not to set the overlap area SCd, printing speed may decrease because of the increase in the process time. Thus, even when the pieces of partial printing data are regenerated, the disadvantage (the increase in the process time) may be larger than the advantage (the increase in the conveyance amount of the sheet S). In this embodiment, no partial printing data is regenerated, thus inhibiting the decrease in printing speed that may otherwise be caused by the regeneration of the pieces of partial printing data.

As understood from the above explanation, the conveyance direction AR of this embodiment is an exemplary sub-scan direction. The conveyor 140 is an exemplary sub-scan section, and each of the overlap candidate areas JAa to JAd is an exemplary specified portion.

Modified Examples (1) In the above embodiment, when the downstream portion is formed only by the white pixels and black pixels, the overlap candidate area adjacent to the upstream side of the downstream portion is not set as the overlap area. That is, when the downstream portion is formed by the white pixels and black pixels, the CPU 210 estimates that the overlap candidate area satisfies the specifying condition. This estimation method is an example, and the present disclosure is not limited thereto.

For example, the CPU 210 may estimate whether the overlap candidate area satisfies the specifying condition based on pieces of dot data generated using the RGB image data that corresponds to the downstream portion. Specifically, the CPU 210 may estimate that the overlap candidate area satisfies the specifying condition, when dots formed based on the pieces of dot data corresponding to the downstream portion only include black large dots.

Figure 11A:
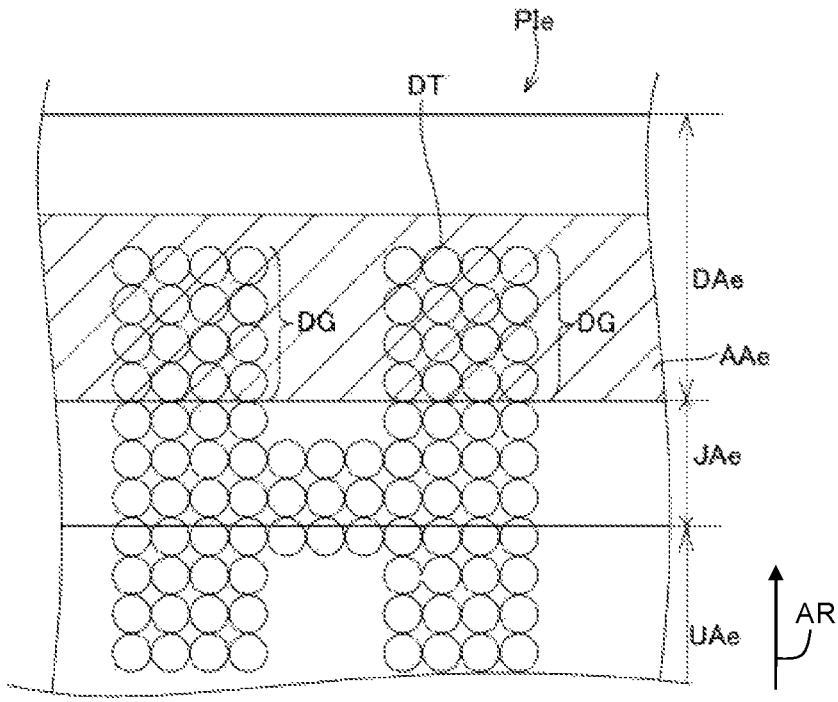
FIGS. 11A and 11B illustrate estimation methods according to modified examples.
Figure 11B:
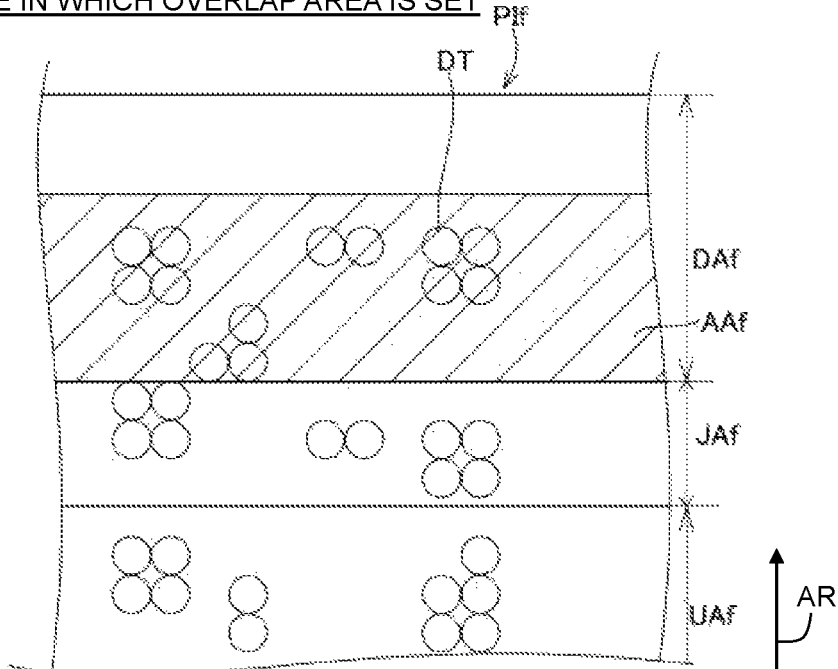

Further, the CPU 210 may estimate whether the overlap candidate area satisfies the specifying condition while including continuity in the conveyance direction AR of the black pixels or black large dots in the downstream portion. An example thereof is explained with reference to FIGS. 11A and 11B. FIGS. 11A and 11B illustrate estimation methods according to modified examples.

FIGS. 11A and 11B depict an exemplary printing image PIe and an exemplary printing image PIf formed by dots, respectively. The printing image PIe of FIG. 11A includes a downstream portion DAe, an overlap candidate area JAe, and an upstream portion UAe. For example, the CPU 210 determines whether only a large dot group DG is formed in a predefined area AAe (hatched portion) included in the downstream portion DAe and adjacent to the overlap candidate area JAe. The large dot group DG is formed by a predefined number or more of black large dots DT (four dots in FIG. 11A) continuously arranged in the conveyance direction AR. When only the large dot group DG is formed in the predefined area AAe as depicted in FIG. 11A, the CPU 210 estimates that the overlap candidate area JAe satisfies the specifying condition. In other words, the specifying condition is that only the large dot group DG is formed in the predefined area AAe. Thus, in this case, the overlap candidate area JAe is not set as the overlap area. This is because, when only the large dot group DG is formed in the predefined area AAe, it is likely that black large dots, which have the continuity with the large dot group DG in the predefined area AAe, are formed in the overlap candidate area JAe. Such large dots represent, for example, black letters.

The printing image PIf of FIG. 11B includes a downstream portion DAf, an overlap candidate area JAf, and an upstream portion UAf. In the example of FIG. 11B, a predefined area AAf (hatched portion) included in the downstream portion DAf and adjacent to the overlap candidate area JAf includes large dots DT not forming the large dot group DG. In this case, the CPU 210 estimates that the overlap candidate area JAf does not satisfy the specifying condition. Thus, in this case, the overlap candidate area JAf is set as the overlap area. It is considered that the dots DT not forming the large dot group DG (e.g., dots having any other color, medium dots, small dots, isolated large dot(s)) form halftone dots expressing the intermediate color in the photograph PO or the like.

The CPU 210 may determine whether only the large dot group DG is formed in the predefined areas AAe and AAf of the downstream portions, based on the RGB image data or the pieces of dot data.

(2) In the above embodiment, the specifying condition is that the pixels in the overlap candidate area only include the black pixels and white pixels. The present disclosure, however, is not limited thereto. More generally, the specifying condition is a condition satisfied when an index (e.g., density, chromaticness, and luminosity), which is related to a difference between a color expressed when dots included in the dots (referred to as first end dots) corresponding to the overlap candidate area (e.g., JAe in FIG. 11A) and formed at an upstream end of the overlap candidate area overlap with dots (referred to as second end dots) positioned at a downstream end of the upstream portion (e.g., UAe in FIG. 11A) and a color expressed when the first end dots do not overlap with the second end dots, is equal to or less than a reference. In such a case, even when the first end dots overlap with the second end dots, the black streak is inconspicuous. It is thus less necessary to set the overlap candidate area as the overlap area.

For example, the specifying condition may be that the pixels in the overlap candidate area only include the black pixels, the white pixels, and pixels with a color (e.g., cyan or magenta) that corresponds to an ink different from black. In this case, for example, the CPU 210 may estimate that the overlap candidate area satisfies the specifying condition, for example, when the pixels in the downstream portion only include the black pixels, the white pixels, and the pixels with the color (e.g., cyan or magenta) that corresponds to the ink different from black. Alternatively, the specifying condition may be that the pixels in the overlap candidate area only include the white pixels and pixels with a color having a density higher than a specified reference density. In this case, the CPU 210 may estimate that the overlap candidate area satisfies the specifying condition, when the pixels in the downstream portion only include the white pixels and the pixels with the color having the density higher than the specified reference density.

The pixels determined as black pixels may include any other pixel, in addition to the pixel having RGB values of (0, 0, 0). For example, the pixels determined as black pixels may include a pixel having RGB values of (1, 1, 1). For example, a dot expressing a specified color may overlap with any other dot. In this case, when the change in color caused by the overlap is small and the overlap portion is inconspicuous like a dark color streak (black streak), the pixel having the specified color is added as the any other pixel. For example, a pixel having RGB values that is within a predefined range to satisfy the above condition (e.g., a pixel having RGB values of (2, 2, 2) or a pixel having RGB values of (1, 2, 2)) may be added as the any other pixel. The pixels determined as black pixels may be, for example, changed depending on a type of the printing medium or a printing mode.

Further, the CPU 210 may analyze the pieces of data included in the object image data and corresponding to the downstream portion, and specify the type and position of the object in the downstream portion. In other words, the specifying condition is that a letter(s) is/are included in the predefined area of the downstream portion. In this case, the CPU 210 may estimate that the overlap candidate area satisfies the specifying condition, when the object in the downstream portion includes the letter(s) only. The CPU 210 may estimate that the overlap candidate area does not satisfy the specifying condition, when the object in the downstream portion includes an object different from the letter(s).

In the above embodiment or the modified examples, it is not indispensable that the range used for estimating whether the overlap candidate area satisfies the specifying condition is the entire downstream portion. For example, the CPU 210 may estimate whether the overlap candidate area satisfies the specifying condition based on a part of the downstream portion (e.g., a part adjacent to the overlap candidate area or a part relatively close to the overlap candidate area).

(3) In the above embodiment, the overlap candidate areas JAa, JAb (FIGS. 9A and 9B) include upstream ends of the partial areas RA1*a*, RA1*b* included in the object images RIa, RIb and printed by the partial printing in the head positions P1*a*, P1*b*. Thus, the partial areas RA1*a*, RA1*b* printed by the partial printing in the head positions P1*a*, P1*b* do not include portions positioned upstream of the overlap candidate areas JAa, JAb. Instead of this, an area set as the overlap area at all times (also referred to as a fixed overlap area) may be provided upstream of the overlap candidate area.

Figure 12A:
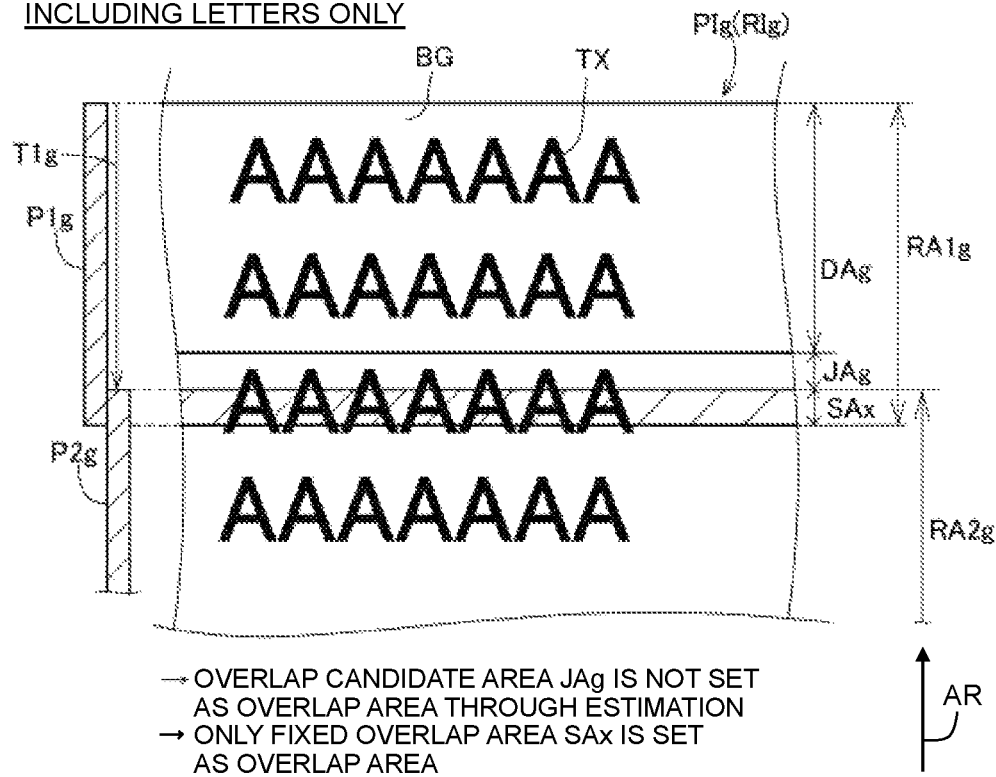
FIGS. 12A and 12B illustrate printing according to modified examples.
Figure 12B:
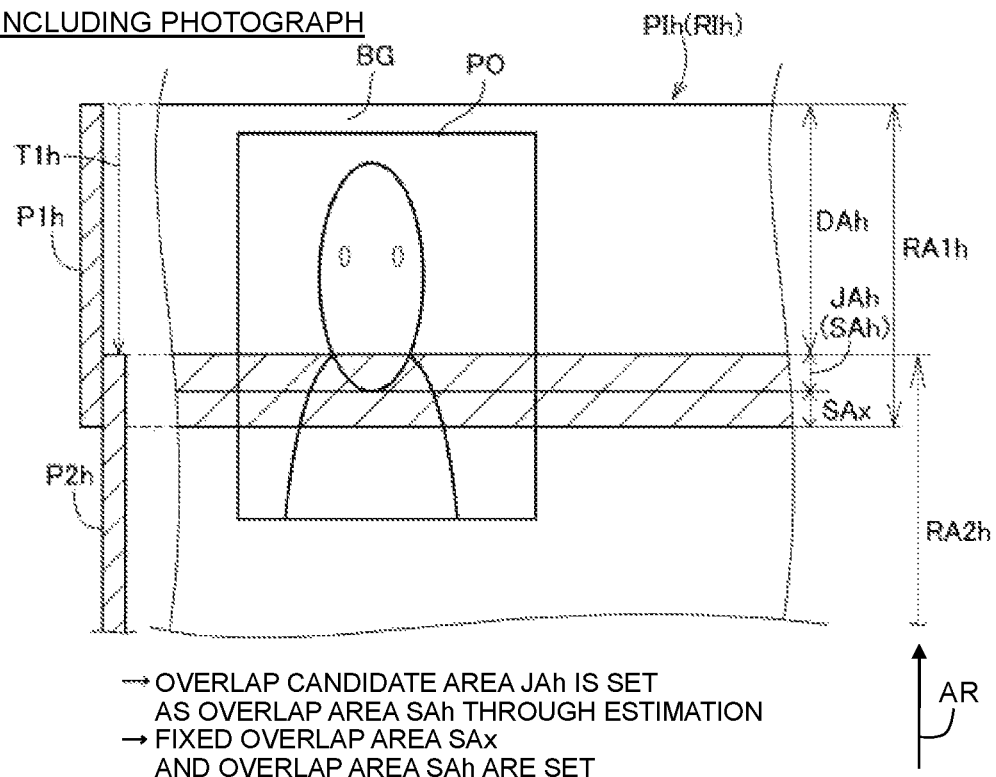

FIGS. 12A and 12B illustrate printing according to modified examples. In an object image RIg and a printing image PIg of FIG. 12A, a partial area RA1*g* corresponding to partial printing executed in a head position P1*g* includes an overlap candidate area JAg, a downstream portion DAg positioned downstream of the overlap candidate area JAg, and a fixed overlap area SAx positioned upstream of the overlap candidate area JAg. In the example of FIG. 12A, the downstream portion DAg only includes black letters TX. Thus, the CPU 210 estimates that the overlap candidate area JAg and the fixed overlap area SAx satisfy the specifying condition through the estimation based on the downstream portion DAg, and the overlap candidate area JAg is not set as the overlap area. In this modified example, the fixed overlap area SAx is set as the overlap area when the CPU 210 estimates that the overlap candidate area JAg and the fixed overlap area SAx satisfy the specifying condition. Thus, a conveyance amount of sheet conveyance T1*g* between the partial printing in the head position Pg1 and partial printing in a head position P2*g* (corresponding to a partial area RA2*g*) is set, for example, to an amount (D−H) obtained by subtracting α width H in the conveyance direction AR of the fixed overlap area SAx from the nozzle length D.

In an object image RIh and a printing image PIh of FIG. 12B, a partial area RA1*h* corresponding to partial printing executed in a head position P1*h* includes an overlap candidate area JAh, a downstream portion DAh positioned downstream of the overlap candidate area JAh, and the fixed overlap area SAx positioned upstream of the overlap candidate area JAh. In the example of FIG. 12B, the downstream portion DAh includes the photograph PO that is an object different from the black letters TX. Thus, the CPU 210 estimates that the overlap candidate area JAh and the fixed overlap area SAx do not satisfy the specifying condition through the estimation based on the downstream portion DAh, and the overlap candidate area JAh is set as the overlap area. In this modified example, both the fixed overlap area SAx and the overlap candidate area JAh are set as the overlap areas. Thus, a conveyance amount of sheet conveyance T1*h* between the partial printing in the head position P1*h* and partial printing in a head position P2*h* (corresponding to a partial area RA2*h*) is set, for example, to an amount (D−2H) obtained by subtracting α total (2H) of the widths in the conveyance direction AR of the two overlap areas SAh and SAx from the nozzle length D.

In other words, in the modified examples depicted in FIGS. 12A and 12B, the width(s) in the conveyance direction AR of the overlap area(s) to be set is/are changed depending on the estimation based on the downstream portions DAg, DAh.

(4) Instead of the sheet S, any other medium, such as OHP films, CD-ROM, DVD-ROM, cloths made of cotton, cloths made of chemical fibers, and resin cases for smart phones, may be adopted.

(5) In the printing mechanism 100 of the above embodiment, the conveyor 140 as the sub-scan section conveys the sheet S so that the sheet S is moved in the conveyance direction AR (sub-scan direction) relative to the printing head 110. Instead of this configuration, the sub-scan section may be configured to move the printing head 110 in a direction opposite to the sub-scan direction relative to the fixed sheet S such that the sheet S is moved in the sub-scan direction relative to the printing head 110. Further, the sub-scan section may include, for example, a stage for supporting a case for a smartphone as the printing medium, in a position facing the nozzle formation surface 111 of the printing head 110 and a mechanism for moving the stage in the sub-scan direction (e.g., a mechanism including a motor or a gear).

(6) In the above embodiment, the main-scan direction is a direction intersecting with the conveyance direction AR (sub-scan direction) at a right angle. Instead of this, the main-scan direction may be a direction intersecting with the conveyance direction AR obliquely.

(7) In the above embodiment, the controller that executes the printing process of FIGS. 5A and 5B is the CPU 210. Instead of this, the controller that executes the printing process of FIGS. 5A and 5B may be a dedicated hardware circuit such as an ASIC or a control circuit obtained by combining the CPU and the dedicated hardware circuit. That is, although the printing process of FIGS. 5A and 5B is achieved by software in the above embodiment, a part or the entirety of the printing process may be achieved by the hardware circuit.

(8) The printing process of FIGS. 5A and 5B may be executed by any other apparatus that can communicate with the printer 200, for example, a terminal apparatus of a user (not depicted). In this case, for example, the terminal apparatus operates as a printer driver by executing a driver program. The terminal apparatus controls the printer as a part of the function as the printer driver to execute the printing process of FIG. 5. In this case, the terminal apparatus causes the printer to execute printing by supplying a printing job, which includes pieces of partial printing data and control data indicating the conveyance amount(s), to the printer.

The printing process of FIGS. 5A and 5B may be executed, for example, by a server that obtains image data from the printer or the terminal apparatus and generates a printing job by use of the image data. The server may be calculators that communicate with each other via a network.

The present disclosure is explained above based on the embodiment and the modified examples. The embodiment and the modified examples described above are provided to facilitate understanding of the present disclosure, and the present disclosure is not limited to those. The present disclosure may be changed or modified without departing from the gist and the scope of the claims below, and includes equivalents thereof.

What is claimed is:

1. A printing apparatus comprising: a print execution section and a controller,
   wherein the print execution section includes:
      a printing head having a plurality of nozzles from which ink is discharged, the nozzles having different positions in a sub-scan direction;
      a main-scan section configured to execute main-scan to move the printing head along a main-scan direction, which intersects with the sub-scan direction, relative to a printing medium; and
      a sub-scan section configured to execute sub-scan to move the printing medium along the sub-scan direction relative to the printing head,
   wherein the controller is configured to:
      obtain object image data indicating an object image formed by a plurality of pixels,
      generate a plurality of pieces of partial printing data by processing the object image data in an order from a downstream side toward an upstream side in the sub-scan direction, and
      cause the print execution section to execute, a plurality of times, the sub-scan and partial printing in which the ink is discharged from the printing head during the main-scan by use of the pieces of partial printing data,
   the object image includes a specified portion, a downstream portion positioned downstream of the specified portion in the sub-scan direction, and an upstream portion positioned upstream of the specified portion in the sub-scan direction,
   the partial printing executed the plurality of times includes first partial printing and second partial printing, the first partial printing being executed by use of first partial printing data from among the pieces of partial printing data, the second partial printing being executed after the first partial printing by use of second partial printing data from among the pieces of partial printing data,
   the controller is configured to determine whether the specified portion satisfies a specifying condition, not using data included in the object image data and corresponding to the specified portion but using data included in the object image data and corresponding to the downstream portion,
   in a case that the controller has determined that the specified portion does not satisfy the specifying condition, the controller is configured to:
      generate the first partial printing data and the second partial printing data such that at least a part of the downstream portion is printed by the first partial printing, at least a part of the upstream portion is printed by the second partial printing, and the specified portion is printed by the first partial printing and the second partial printing, and
      set a conveyance amount of the sub-scan between the first partial printing and the second partial printing to a first amount,
   in a case that the controller has determined that the specified portion satisfies the specifying condition, the controller is configured to:
      generate the first partial printing data and the second partial printing data such that at least a part of the downstream portion is printed by the first partial printing, at least a part of the upstream portion is printed by the second partial printing, and the specified portion is printed by the first partial printing and is not printed by the second partial printing, and
      set the conveyance amount of the sub-scan between the first partial printing and the second partial printing to a second amount that is larger than the first amount.

2. The printing apparatus according to claim 1,
   wherein the specified portion includes an upstream end in the sub-scan direction of a part of the object image to be printed by the first partial printing, and
   in the case that the controller has determined that the specified portion satisfies the specifying condition, the controller is configured not to print the upstream portion by the first partial printing.

3. The printing apparatus according to claim 2, wherein the second amount is an amount smaller than a nozzle length of the printing head.

4. The printing apparatus according to claim 3,
   wherein the specifying condition is that an index, which is related to a difference between a color expressed in a case that a plurality of first end dots overlap with a plurality of second end dots and a color expressed in a case that the plurality of first end dots do not overlap with the plurality of second end dots, is equal to or less than a reference,
   the first end dots are included in a plurality of dots corresponding to the specified portion and positioned at an upstream end in the sub-scan direction of the specified portion, and
   the second end dots are included in a plurality of dots corresponding to the upstream portion and positioned at a downstream end in the sub-scan direction of the upstream portion.

5. The printing apparatus according to claim 4, wherein the controller is configured to determine that the specified portion satisfies the specifying condition in a case that pieces of partial data corresponding to at least the part of the downstream portion only include pixel data that indicates a specified ink color and pixel data that indicates a color to be expressed by a color of the printing medium.

6. The printing apparatus according to claim 5,
   wherein the pixel data that indicates the specified ink color is pixel data indicating a black color, and the pixel data that indicates the color to be expressed by the color of the printing medium is pixel data indicating a white color.

7. The printing apparatus according to claim 4, wherein the controller is configured to determine that the specified portion satisfies the specifying condition in a case that the controller has determined that only at least one continuous dot group is formed in a predefined area included in the downstream portion and adjacent to the specified portion, and the at least one continuous dot group is formed by a plurality of dots formed continuously in the sub-scan direction.

8. The printing apparatus according to claim 4, wherein the controller is configured to specify a kind of an object included in a predefined area of the downstream portion, and the controller is configured to determine that the specified portion satisfies the specifying condition in a case that the predefined area only includes letters.

9. The printing apparatus according to claim 1, wherein in the case that the controller has determined that the specified portion satisfies the specifying condition, the controller is configured to determine whether the specified portion satisfies the specifying condition again by using data corresponding to the specified portion, after the generation of the first partial printing data is started such that the specified portion is printed by the first partial printing and is not printed by the second partial printing, and in a case that the controller has determined based on the determination that the specified portion does not satisfy the specifying condition, the controller is configured to restart generation of the first partial printing data such that the specified portion is printed by the first partial printing and the second partial printing.

10. The printing apparatus according to claim 9, wherein in the case that the controller has determined that the specified portion does not satisfy the specifying condition, the controller is configured not to restart the generation of the first partial printing data.

11. A printing apparatus comprising: a print execution section and a controller,
wherein the print execution section includes:
a printing head having a nozzle from which ink is discharged;
a carriage configured to move the printing head along a main-scan direction relative to a printing medium; and
a conveyor configured to convey the printing medium along a sub-scan direction, which intersects with the main-scan direction, relative to the printing head,
the controller is configured to execute:
an obtaining process of obtaining object image data indicating an object image;
a first partial printing process executed using first partial printing data; and
a second partial printing process executed using second partial printing data,
the object image includes a specified portion, a downstream portion positioned downstream of the specified portion in the sub-scan direction, and an upstream portion positioned upstream of the specified portion in the sub-scan direction, the controller is configured to execute:
a first determination process of determining whether the downstream portion satisfies a specifying condition, by using the first partial printing data; and
a conveyance process of conveying the printing medium by the conveyor between the first partial printing process and the second partial printing process, and
in a case that the controller has determined that the downstream portion satisfies the specifying condition, the controller is configured to make a conveyance amount of the printing medium by the conveyor larger than a case in which the controller has determined that the downstream portion does not satisfy the specifying condition.

12. The printing apparatus according to claim 11, wherein the controller is configured to execute:
a first selection process of selecting a specified pixel in the downstream portion; and
a second determination process of determining whether the specified pixel is a pixel indicating a block color, and
the specifying condition is that the specified pixel is the pixel indicating the block color.

13. The printing apparatus according to claim 11, wherein the controller is configured to execute:
a selection process of selecting a specified pixel in the downstream portion; and
a second determination process of determining whether the specified pixel is a pixel indicating a white color, and
the specifying condition is that the specified pixel is the pixel indicating the white color.

14. The printing apparatus according to claim 11, wherein the controller is configured to print the specified portion by the first partial printing process and the second partial printing process, in the case that the controller has determined that the downstream portion does not satisfy the specifying condition, and
the controller is configured to print the specified portion by any one of the first partial printing process and the second partial printing process, in the case that the controller has determined that the downstream portion satisfies the specifying condition.

15. The printing apparatus according to claim 11, wherein, in the case that controller has determined that the downstream portion satisfies the specifying condition, the controller is configured to tentatively determine that the specified portion is printed by any one of the first partial printing process and the second partial printing process,
after the tentative determination, the controller is configured to execute a second selection process of selecting a specified pixel in the specified portion and a fourth determination process of determining whether the specified pixel is a pixel indicating a block color, and
in a case that the controller has determined that the specified pixel is not the pixel indicating the black color, the controller is configured to determine that the specified portion is printed by the first partial printing process and the second partial printing process.

16. The printing apparatus according to claim 15, wherein in the case that the controller has determined that the specified portion is printed by the first partial printing process and the second partial printing process, the controller is configured not to execute the fourth determination process.

17. The printing apparatus according to claim 11,
wherein, in the case that controller has determined that the downstream portion satisfies the specifying condition, the controller is configured to tentatively determine that the specified portion is printed by any one of the first partial printing process and the second partial printing process,
after the tentative determination, the controller is configured to execute a second selection process of selecting a specified pixel in the specified portion and a fifth determination process of determining whether the specified pixel is a pixel indicating a white color, and
in a case that the controller has determined that the specified pixel is not the pixel indicating the white color, the controller is configured to determine that the specified portion is printed by the first partial printing process and the second partial printing process.

18. The printing apparatus according to claim 17, wherein in the case that the controller has determined that the specified portion is printed by the first partial printing process and the second partial printing process, the controller is configured not to execute the fifth determination process.

19. The printing apparatus according to claim 11, wherein the specifying condition is that a letter is included in a predefined area of the downstream portion.

20. The printing apparatus according to claim 11,
wherein the downstream portion includes an adjacent area that is adjacent to the specified portion, and
the specifying condition is that a dot group, which is formed by a plurality of continuous dots, is formed in the adjacent area.

21. The printing apparatus according to claim 11,
wherein the specified portion includes a first end dot that is included in a plurality of dots corresponding to the specified portion and that is positioned at an upstream end in the sub-scan direction and a second end dot that is included in a plurality of dots corresponding to the upstream portion and that is positioned at a downstream end in the sub-scan direction, and
the specifying condition is that an index, which is related to a difference between a color expressed in a case that the first end dot overlaps with the second end dot and a color expressed in a case that the first end dot does not overlap with the second end dot, is equal to or less than a reference.

* * * * *